US006381740B1

(12) United States Patent
Miller et al.

(10) Patent No.: US 6,381,740 B1
(45) Date of Patent: Apr. 30, 2002

(54) METHOD AND SYSTEM FOR INCREMENTALLY IMPROVING A PROGRAM LAYOUT

(75) Inventors: John W. Miller, Kirkland; John R. Douceur, Bellevue; Robert P. Fitzgerald, Redmond, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 08/931,151

(22) Filed: Sep. 16, 1997

(51) Int. Cl.$^7$ ................................................. G06F 9/00

(52) U.S. Cl. .................................. 717/9; 716/9; 716/12

(58) Field of Search ................................. 395/670, 709; 364/513; 709/300; 717/4, 5, 8, 9; 716/8, 9, 12; 702/182; 700/28

(56) References Cited

U.S. PATENT DOCUMENTS

| | | | | |
|---|---|---|---|---|
| 3,427,443 A | | 2/1969 | Apple et al. ................. 235/153 |
| 3,551,659 A | | 12/1970 | Forsythe ....................... 235/153 |
| 4,047,243 A | | 9/1977 | Dijkstra ........................ 364/200 |
| 4,120,030 A | | 10/1978 | Johnstone .................... 364/200 |
| 4,495,559 A | * | 1/1985 | Gelatt, Jr. et al. .......... 364/148 |
| 4,633,388 A | | 12/1986 | Chiu ............................. 364/200 |
| 4,642,765 A | | 2/1987 | Cocke et al. ................ 364/300 |
| 4,646,234 A | | 2/1987 | Tolman et al. ............... 364/200 |
| 4,656,583 A | | 4/1987 | Auslander et al. .......... 364/200 |
| 4,731,740 A | | 3/1988 | Eguchi ......................... 364/200 |
| 4,763,255 A | | 8/1988 | Hopkins et al. ............. 364/300 |
| 4,819,233 A | | 4/1989 | DeLucia et al. .............. 371/19 |
| 4,868,738 A | | 9/1989 | Kish et al. ................... 364/200 |
| 5,062,055 A | * | 10/1991 | Chinnaswamy et al. .... 364/513 |
| 5,097,504 A | | 3/1992 | Camion et al. ................ 380/23 |
| 5,212,794 A | * | 5/1993 | Pettis et al. .................. 709/300 |
| 5,247,687 A | * | 9/1993 | Eilert et al. .................. 709/104 |
| 5,301,318 A | * | 4/1994 | Mittal | |
| 5,442,645 A | | 8/1995 | Ugon et al. ................. 371/25.1 |
| 5,606,698 A | * | 2/1997 | Powell ......................... 395/709 |

(List continued on next page.)

OTHER PUBLICATIONS

Naps, "Introduction to Data Structure with Pascal", 1986, pp. 286–313.*
Aho et al., "Data Structures and Algorithms," Addison–Wesley, Reading, MA, 1985, pp. 215–218 (Section 6.5.).

(List continued on next page.)

Primary Examiner—Zarni Maung
Assistant Examiner—George L Opie
(74) Attorney, Agent, or Firm—Merchant & Gould PC; John E. Whitaker

(57) ABSTRACT

A method and system for incrementally improving the layout of a program image of a computer program to reduce the working set. The system iteratively selects pairs of basic blocks and reorders the basic blocks in the range delimited by the selected pair of basic blocks. The system selects the pairs of basic blocks so that the working set of the computer program is improved by reordering the basic block in the range. Thus, during each iteration, the working set is improved. The system continues with these iterations until a termination condition (e.g., number of iterations) is satisfied. In one embodiment, during each iteration the system designates one of the basic blocks as an initial anchor basic block. The system then repeats the following until the same range of basic blocks is identified twice in a row. The system first finds a basic block such that when the basic blocks in the range from the anchor basic block to the found basic block are reordered, the working set is more favorable than reordering any other range that ends with the anchor basic block. The system then designates the found basic block as the new anchor basic block. When the same range is found twice in a row, the system reorders the basic blocks in the range. This process is repeated for each iteration until a termination condition is satisfied. The resulting reordered program image has its working set improved.

56 Claims, 14 Drawing Sheets-

U.S. PATENT DOCUMENTS

| | | | | |
|---|---|---|---|---|
| 5,664,191 A | * | 9/1997 | Davidson et al. | 395/670 |
| 5,706,503 A | * | 1/1998 | Poppen et al. | 707/100 |
| 5,721,917 A | * | 2/1998 | Elliott et al. | 707/202 |
| 5,752,038 A | * | 5/1998 | Blake et al. | 395/709 |
| 5,889,999 A | * | 3/1999 | Breternitz, Jr. et al. | 395/709 |
| 6,004,015 A | * | 12/1999 | Watanabe et al. | 364/148 |

OTHER PUBLICATIONS

Alan Dain Samples, Dissertation Submitted in Partial Satisfaction of the Requirements for the Degree of Doctor of Philosophy in Computer Science in the Graduate Division of the University of California at Berkeley, 1991, p. 1–179.

Ball, Thomas et al., "Optimally Profiling and Tracing Programs," University of Wisconsin, Computer Sciences Dept. Technical Report 1031, 1991, p. 1–27.

Baxter, William et al., "Code Restructuring for Enhanced Performance on a Pipelined Processor," IEEE COMPCON, 1991, p. 252–260.

Chang et al., "Using Profile Information to Assist Classic Code Optimizations," Soft. Practice and Experience, vol. 21(12), Dec. 1991, p. 1301–1321.

Clark et al., L.H., "A Linear Time Algorithm for Graph Partition Problems," Information Processing Letters, vol. 42, No. 1, 1992, p. 19–24.

Grishman, Ralph, "Assembly Language Programming for the Control Data Series," Algorithmics Press, $2^{nd}$ Edition, $2^{nd}$ Printing, Jan. 1972, p. 45–53 and p. 176–184.

Guo, Hong et al., "A Fast Algorithm for Simulated Annealing," Physica Scripta, vol. T38, 1991, p. 40–44.

Johnson, David S. et al., "Optimization by Simulated Annealing: An Experimental Evaluation; Part I, Graph Partitioning," Operations Research, vol. 37, No. 6, Nov.–Dec. 1989, p. 865–892.

Johnson, S.C., "Postloading for Fun and Profit," USENIX Winter, 1990, p. 325–330.

Kernighan, B.W. et al., "An Efficient Heuristic Procedure for Partitioning Graphs," The Bell System Technical Journal, Feb. 1970, p. 291–307.

Larus et al., "Rewriting Executable Files to Measure Program Behavior," University of Wisconsin, Computer Science Dept. Technical Report 1083, Mar. 25, 1992, p. 1–17.

Lee, C–H et al., "Efficient Algorithm for Graph–Partitioning Problem Using a Problem Transformation Method," Computer–Aided Design, vol. 21, No. 10, Dec. 1989, p. 611–618.

Optimite Systems, "Beta Release User's Guide," PC Opt Verison 1.1, 1992, p. 1,3–40.

Pettis, Karl et al., "Profile Guided Code Positioning," Proceedings of the ACM SIGPLAN '90 Conference on Programming Language Design and Implementation, White Plains, NY, Jun. 20–22, 1990, p. 16–27.

Sarkar, Vivek, "Determining Average Program Execution Times and Their Variance," Proceedings of SIGPLAN '89 Conference on Programming Language Design and Implementation, SIGPLAN Notices, vol. 24, No. 7, Jul. 1989, p. 298–312.

Sedgewick, Robert, "Weighted Graphics," Algorithms in C, Chapter 31, p. 451–468.

Speer et al., "Improving UNIX Kernel Performance Using Profile Based Optimization," Proceedings of 1994 Winter USENX Conference, San Francisco, CA, Jan. 17–21, 1994, p. 181–188.

Tarjan, Robert Endre, "Minimum Spanning Trees," Data Structures and Network Algorithms, Murray Hills, NJ, 1983, Chapter 6, p 71–83.

Van Den Bout, David E. et al., "Graph Partitioning Using Annealed Neural Networks," IEEE Transactions on Neural Networks, vol. 1, No. 2, Jun. 1990, p. 192–203.

Wall, David W., "Systems for Late Code Modification," WRL Research 92/3, May, 1992, p. 1–24.

* cited by examiner

SEARCHES: 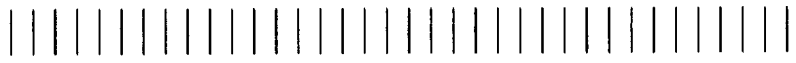
LINKER CALLS: 
SIZE CHANGES: 
METRIC
FUNCTION: 
*Fig. 10*

Temporal Usage Vectors

| basic block | 111111<br>0123456789012345 |
|---|---|
| 0 | 1101001000011101 |
| 1 | 1000101100111100 |
| 2 | 1010110000000111 |
| 3 | 1101010101111001 |
| 4 | 1011001110011000 |
| 5 | 1110001010000110 |

*Fig. 13A*

Temporal Usage Vectors

| basic block | 111111<br>0123456789012345 |
|---|---|
| 0 | 1101001000011101 |
| 1 | 1000101100111100 |
|   | 1101101100111101 |

*Fig. 13B*

| interval | weight |
|---|---|
| 0 | 5 |
| 1 | 5 |
| 2 | 1 |
| 3 | 1 |
| 4 | 1 |
| 5 | 1 |
| 6 | 1 |
| 7 | 1 |
| 8 | 2 |
| 9 | 2 |
| 10 | 2 |
| 11 | 2 |
| 12 | 1 |
| 13 | 1 |
| 14 | 1 |
| 15 | 1 |

METHOD AND SYSTEM FOR INCREMENTALLY IMPROVING A PROGRAM LAYOUT

RELATED APPLICATIONS

This patent application is related to U.S. patent application Ser. No. 08/931,030 entitled "Method and System for Improving the Layout of a Program Image Using Clustering" and U.S. patent application Ser. No. 08/931,861 entitled "Method and System for Controlling the Improving of a Program Layout, which are being filed concurrently and are hereby incorporated by reference.

TECHNICAL FIELD

This invention relates to a method and system for optimizing a computer program image and, more particularly, to a method and system for rearranging code portions of the program image to reduce the working set.

BACKGROUND OF THE INVENTION

Many conventional computer systems utilize virtual memory. Virtual memory provides a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, but these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used to evaluate the performance of paging is the working set model. At any instance in time, t, there exists a working set, w(k, t), consisting of all the pages used by the k most recent memory references. The operating system monitors the working set of each process and allocates each process enough page frames to contain the process' working set. If the working set is larger than the number of allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make a placement of code within an executable module to reduce the working set. The information required can in general only be obtained by actually executing the executable module and observing its usage. Clearly this cannot be done before the executable module has been created. The executable module initially created by the compiler and linker thus is laid out without regard to any usage pattern.

As each portion of code is executed, the page in which it resides must be in physical memory. Other code portions residing on the same page will also be in memory, even if they may not be executed in temporal proximity. The result is a collection of pages in memory with some required code portions and some unrequired code portions. To the extent that unrequired code portions are loaded into memory, valuable memory space may be wasted, and the total number of pages loaded into memory may be much larger than necessary.

To make a determination as to which code portions are "required" and which code portions are "unrequired," a developer needs execution information for each code portion, such as when the code portion is accessed during execution of the computer program. A common method for gathering such execution information includes adding instrumentation code to every basic block of a program image. A basic block is a portion of code such that if one instruction of the basic block is executed then every instruction is also executed. The execution of the computer program is divided into a series of time intervals (e.g., 500 milliseconds). Each time a basic block is executed during execution of the computer program, the instrumentation code causes a flag to be set for that basic block for the current time interval. Thus, after execution of the computer program, each basic block will have a temporal usage vector ("usage vector") associated with it. The usage vector for a basic block has, for each time interval, a bit that indicates whether that basic block was executed during that time interval. The usage vectors therefore reflect the temporal usage pattern of the basic blocks.

After the temporal usage patterns have been measured, a paging optimizer can rearrange the basic blocks to minimize the working set. In particular, basic blocks with similar temporal usage patterns can be stored on the same page. Thus, when a page is loaded into main memory, it contains basic blocks that are likely to be required.

The minimization of the working set is an NP-complete problem, that is, no polynomial-time algorithm is known for solving the problem. Thus, the time needed to minimize the working set of a program image generally increases exponentially as the number of code portions increase (i.e., $O(e^n)$, where n is the number of code portions). Because complex program images can have thousands, and even hundreds of thousands, of code portions, such an algorithm cannot generate a minimum working set in a timely manner even when the most powerful computers are employed. Because the use of such algorithms are impractical for all but the smallest program images, various algorithms are needed to generate a layout that results in an improved working set (albeit not necessarily the minimal working set) in a timely manner.

SUMMARY OF THE INVENTION

The present invention provides a method and system for incrementally improving the layout of a program image of a computer program to reduce the working set. The system iteratively selects pairs of basic blocks and reorders the basic blocks in the range delimited by the selected pair of basic blocks. The system selects the pairs of basic blocks so that the working set of the computer program is improved by reordering the basic block in the range. Thus, during each iteration, the working set is improved. The system continues with these iterations until a termination condition (e.g., number of iterations) is satisfied.

In one embodiment, during each iteration the system designates one of the basic blocks as an initial anchor basic block. The system then repeats the following until the same range of basic blocks is identified twice in a row. The system first finds a basic block such that when the basic blocks in the range from the anchor basic block to the found basic block are reordered, the working set is more favorable than the reordering of any other range that ends with the anchor basic block. The system then designates the found basic block as the new anchor basic block. When the same range is found twice in a row, the system reorders the basic blocks in the range. This process is repeated for each iteration until the termination condition is satisfied. The resulting reordered program image has its working set improved.

BRIEF DESCRIPTION OF THE DRAWINGS

FIG. 10 illustrates the frequency of invoking of the linker.

Figures 13A, 13B, 13C, 13D:
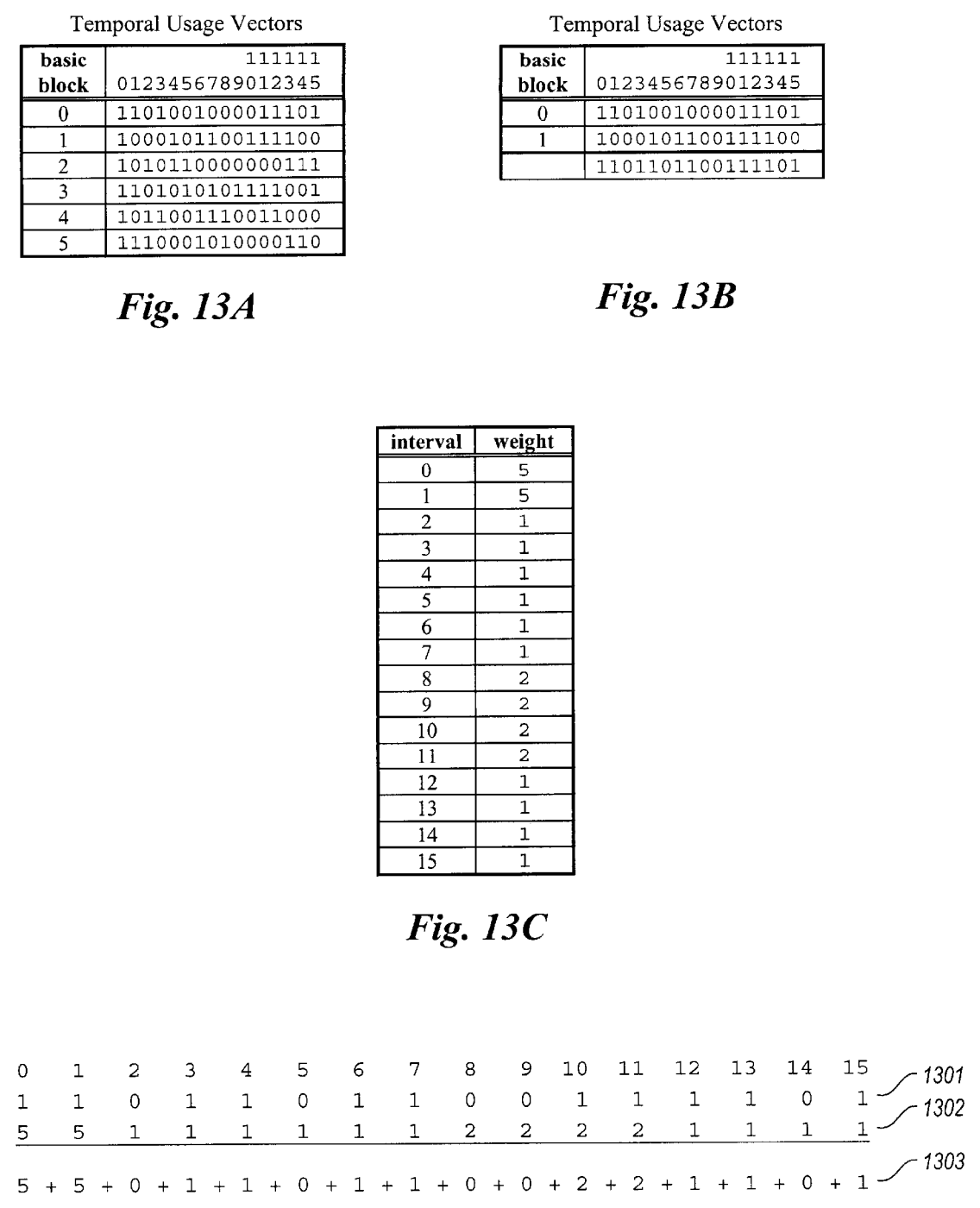

FIG. 13A illustrates sample temporal usage vectors for basic blocks.

FIG. 13B illustrates the temporal usage vector for a page that contains certain basic blocks.

FIG. 13C is a table showing sample weights allocated for each time interval.

FIG. 13D illustrates a sample calculation of the weighted space-time product for the page that contains certain basic blocks.

DESCRIPTION OF THE INVENTION

Figure 1:
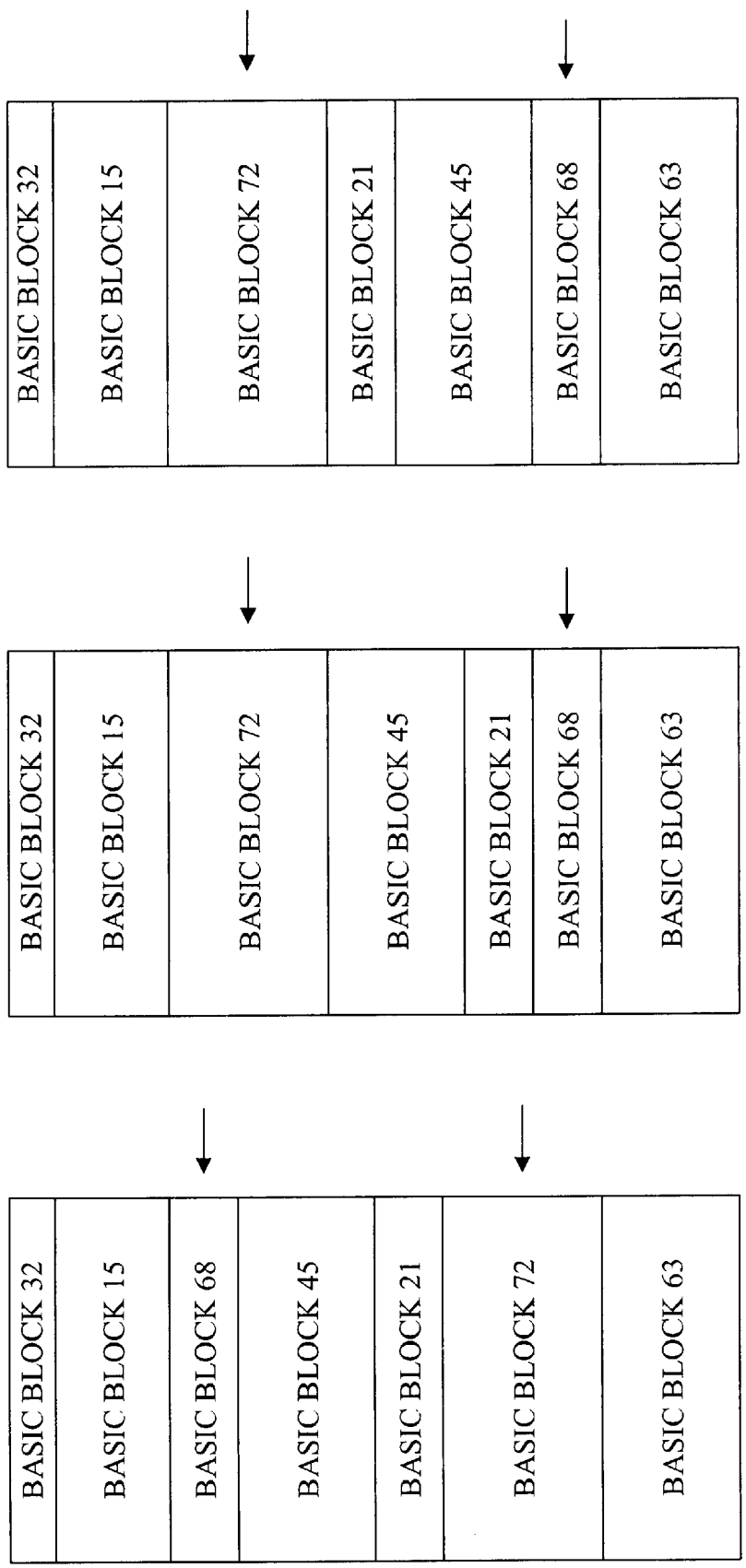
FIGS. 1A–1C illustrate the permuting of a range of basic blocks.

The present invention provides a method and system for incrementally improving the working set of a computer program. In one embodiment, the incremental layout system receives an initial program image that specifies an initial ordering of the code portions (e.g., basic blocks). The initial program image is preferably established by the techniques described in the patent application entitled "Method and System for Improving the Layout of a Program Image using Clustering," which has been incorporated by reference. Such an initial program image has code portions clustered based on their temporal usage patterns. However, the code portions are not necessarily advantageously located with respect to page boundaries. The system of the present invention improves on the working set of the initial program image by iteratively selecting pairs of code portions that delimit a range of code portions and permuting (ie., reordering) the code portions within the range. The system selects pairs of code portions such that when the code portions of the range are permuted (i.e., reordered) the working set is reduced. Thus, during each iteration, one range of code portions is permuted in a way that improves the working set. The system repeats the iterations until a specified termination condition (e.g., a certain number of iterations) is satisfied.

In one embodiment, the system during each iteration randomly selects multiple pairs of basic blocks. The system then determines which of the selected pairs of basic blocks delimit a range that, when the basic blocks within the range are permuted according to a predefined permutation scheme, would result in the greatest improvement of the working set. The system then uses this determined pair of basic blocks as a starting point for identifying another pair of basic blocks that delimit the range to be permuted during the iteration. To identify another pair of basic blocks, the system first designates one basic block of the determined pair of basic blocks as an anchor basic block. The system then calculates a metric value that indicates the effect on the working set that would be obtained by permuting the basic blocks in each possible range of basic blocks that includes the anchor basic block at one end of the range. For example, if there are 10 basic blocks and basic block 2 is designated as the anchor basic block, then the possible ranges are delimited by basic block 0 and basic block 2, basic block 1 and basic block 2, basic block 2 and basic block 3, basic block 2 and basic block 4, and so on. Thus, there are N–1 ranges of basic blocks, where N is the number of basic blocks. The system then designates the basic block at the other end of the range with the smallest calculated metric value (i.e., the range whose permutation would result in the best improvement of the working set) as the new anchor basic block. The system then calculates a metric value for each possible range of basic blocks that includes the newly designated anchor basic block at one end of the range. For example, if the range with the smallest metric value was delimited by old anchor basic block 2 and basic block 7, then basic block 7 would be designated as the new anchor basic block. Thus, the possible ranges would be delimited by basic block 0 and basic block 7, basic block 1 and basic block 7, and so on. This process is repeated until the same range is selected twice in a row. That is, the basic block at the other end of the range was the last anchor basic block designated before the currently designated basic block. For example, if the current range with the smallest metric value is delimited by basic block 2 and the anchor basic block 7, and the previous range with the smallest metric value is basic block 7 and anchor basic block 2, then the same range is selected twice in a row. When the same range has the smallest metric value twice in a row, then the system would otherwise loop forever selecting that same range of basic blocks. The system then permutes the basic blocks in the range. If the termination condition is satisfied, then the system has completed the incremental improvements, else the system starts another iteration by again randomly selecting multiple pairs of basic blocks.

Many different techniques for permuting the basic blocks in a range can be used. For example, the basic blocks in a range could be arbitrarily reordered and the metric value would indicate the effect of such arbitrary reordering on the working set. In one embodiment, techniques referred to as swapping and reflecting are used. A range of basic blocks is swapped by exchanging the order of the end basic blocks of the range. That is, the first basic block of the range is positioned as the last basic block of the range and vice versa. A range is reflected by inverting the order of all the blocks in the range. That is, the last basic block in the range becomes the first basic block in the range, the second to the last basic block in the range becomes the second basic block in the range, and so on.

FIGS. 1A–1C illustrate the permuting of a range of basic blocks. FIG. 1A illustrates the blocks of an example range. In this example, basic block 68 and basic block 72 are the end basic blocks of the range as indicated by the arrows. The range includes basic blocks 68, 45, 21, and 72. FIG. 1B illustrates the swapping of the range of basic blocks. In this example, the ordering of end basic blocks 68 and 72 are exchanged (i.e., swapped). That is, basic block 72 is moved to where basic block 68 was positioned, and basic block 68 is moved to where basic block 72 was positioned. Thus, the reordered range is basic blocks 72, 45, 21, and 68. FIG. 1C illustrates the reflecting of the range of basic blocks. In the example, the basic blocks 68, 45, 21, and 72 are reordered so that the first basic block 68 in the range is positioned as the last basic block in the range, the second basic block 45 in the range is positioned as the second to the last basic block in the range, and so on. Thus, the reordered range is basic blocks 72, 21, 45, and 68.

When the effect of reordering a range of basic blocks is evaluated, the order of all the basic blocks in the program image is known. Thus, the system can generate a metric value that reflects the actual ordering. However, the size of the basic blocks may not be known. The size of a basic block may be dependent on both the ordering of the basic block relative to other basic blocks and the starting location of the basic block. First, the size of references (e.g., pointers and offsets) within a basic block can change depending on the distance between the basic block and the location of the item to which the reference points. For example, some transfer instructions specify a relative offset that can range from −128 to +127 and are represented within 8 bits, and other transfer instructions specify a relative offset that can range from −32,768 to +32,767 and are represented by 16 bits. If the target instruction of a transfer instruction is moved to a location that is to be farther than 127 locations away, then 16 bits are needed to reference the target location. Thus, the size of the basic block that contains the transfer instruction would be one byte larger than if the target location was within 127 locations. Second, certain basic blocks may have alignment constraints. For example, a basic block may need to be aligned on a 16-byte boundary because a certain transfer instruction that transfers control to that basic block can only specify locations at 16-byte boundaries. To correctly specify the size and starting location of each basic block in one ordering of the program image, the system can invoke a conventional linker program that links the program image. As part of the linking process, the linker establishes the size and starting location of each basic block. Thus, with knowledge of the size and starting location of each basic block, the system can calculate the metric value based on the exact program image. However, the overhead associated with invoking the linker every time a metric value is to be calculated may be unacceptable. To avoid the overhead, the system uses several different techniques. With the first technique, the system invokes the linker only occasionally during the process and uses only an approximation of the size of each basic block in between when the linker is invoked. With the second technique, the system maintains the maximum size ever returned by the linker as the approximation of the size of each basic block. With the third technique, the system initially invokes the linker on specified permutations of the initial layout to establish an initial value for each maximum size. Each of these techniques reduces the need to invoke the linker during the improvement process.

Figure 2:
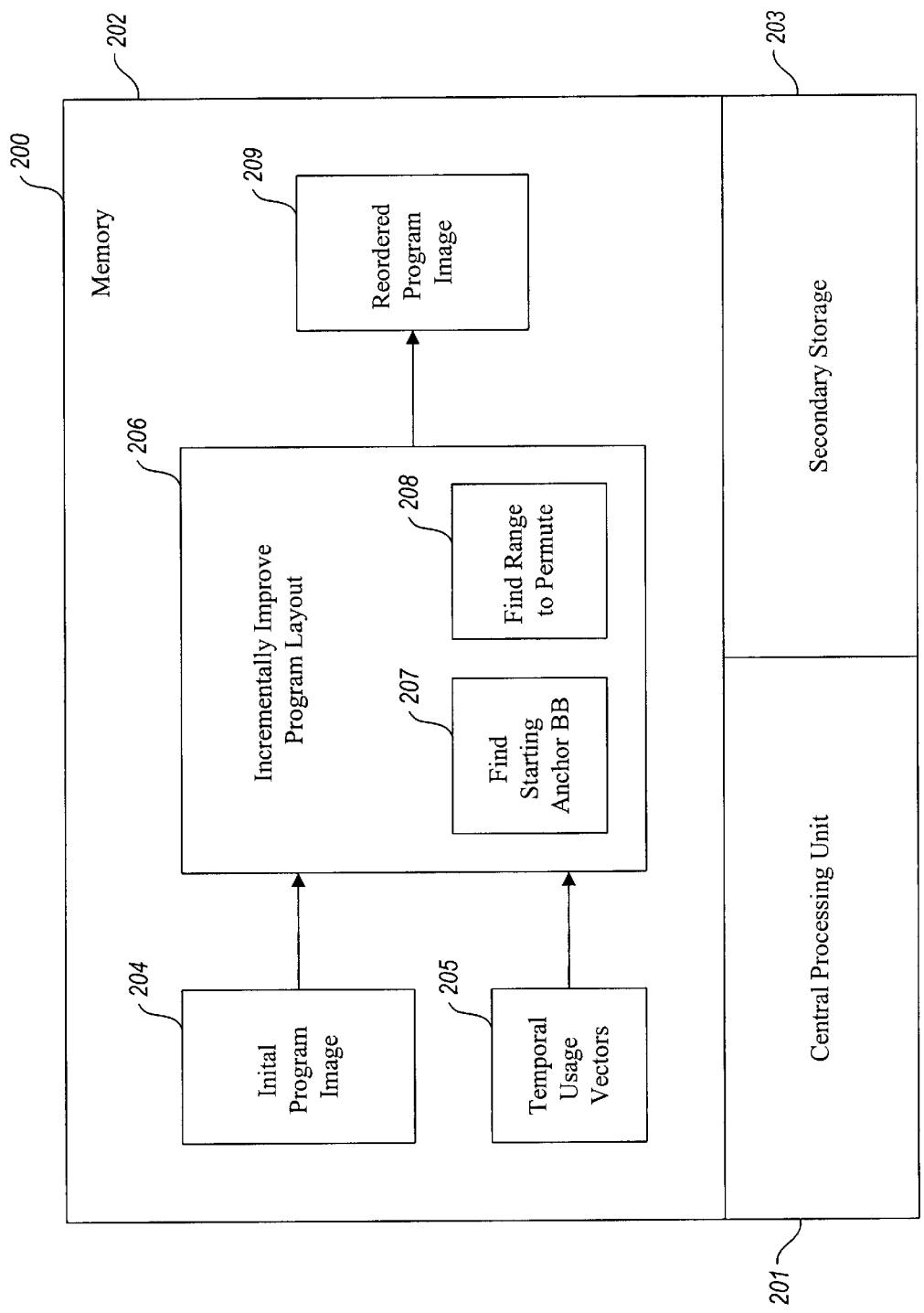
FIG. 2 is a block diagram illustrating the components of the incremental layout system.

FIG. 2 is a block diagram illustrating the components of the incremental layout system. The layout system is preferably executed on a computer system that includes a central processing unit 201, a memory 202, and a secondary storage 203. As shown, the memory contains the initial program image 204 that is to be reordered, temporal usage vectors 205, an incrementally improve program layout component 206, and the resulting reordered program image 209. The incrementally improve program layout component includes a find initial anchor basic block component 207 and find range to permute component 208. The secondary storage includes a disk drive and other computer-readable medium such as a CD-ROM. The incrementally improve program layout component is initially loaded from the secondary storage.

Figure 3:
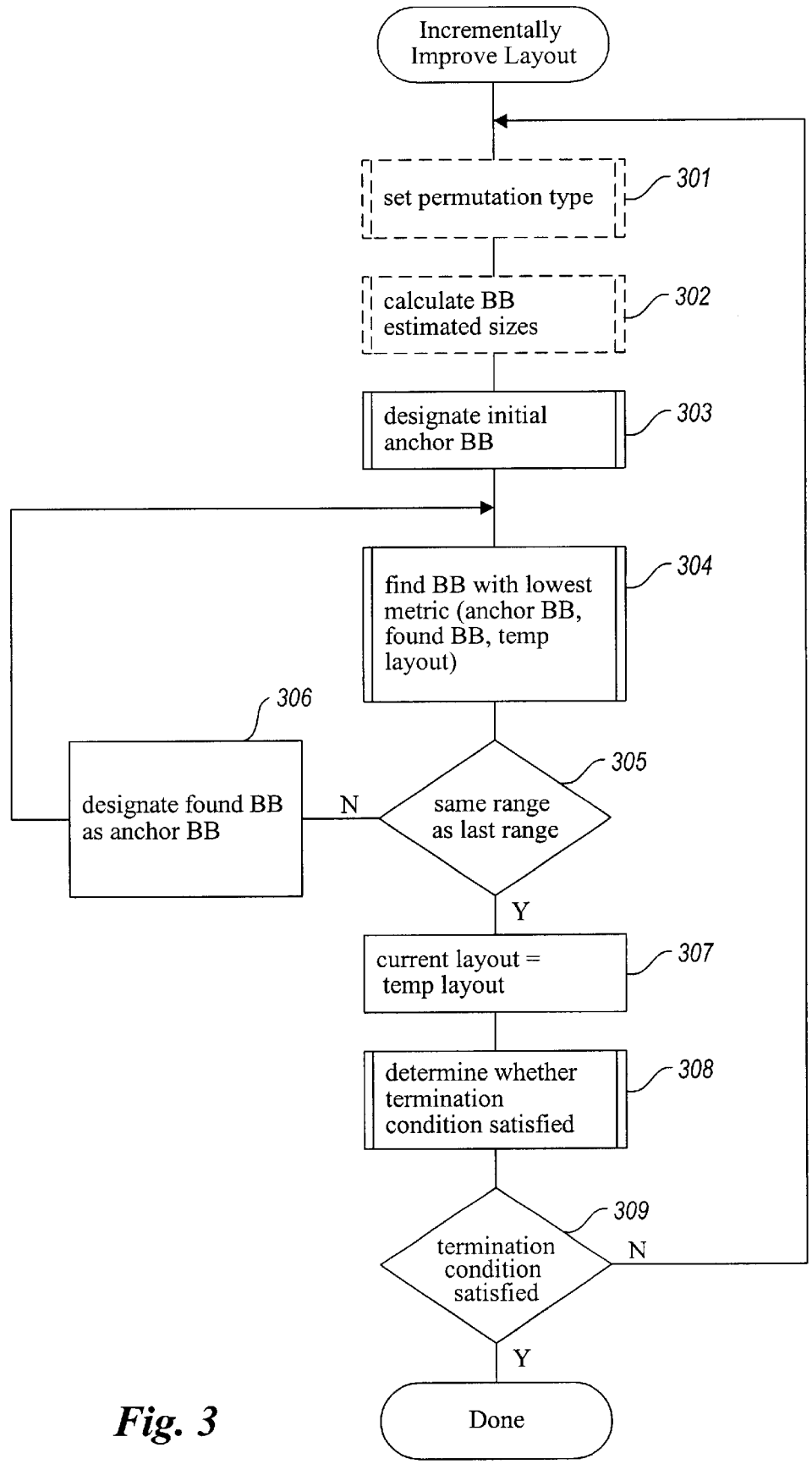
FIG. 3 is a flow diagram of an implementation of a routine to incrementally improve a program layout.

FIG. 3 is a flow diagram of an implementation of a routine to incrementally improve a program layout. The routine receives an initial program image and temporal usage vectors for the basic blocks of the program image. The routine loops selecting and permuting ranges of basic blocks until a termination condition is satisfied. Through each iteration of the loop (i.e., an incremental improvement step), the routine selects an initial anchor basic block. The routine then evaluates, for each other basic block, the effect on the working set of permuting the range of basic blocks delimited by that basic block and the anchor basic block. The routine designates the other basic block that delimits the range with the most favorable effect on the working set (ie., with the smallest metric value) as the new anchor basic block. When the same range (i.e., delimited by the same basic blocks) twice in a row is determined to have the most favorable effect, then the routine permutes the basic block in the range and ends that iteration of the loop. In step 301, the routine invokes a subroutine to set the permutation type. In one embodiment, the permutation type changes between swapping and reflecting a range of basic blocks. Alternatively, the permutation type can be predefined to either swapping or reflecting and does not change during execution of the routine. In step 302, the routine invokes a routine to calculate the estimated size of each basic block. The invoked subroutine can periodically invoke the linker to determine the estimated size for each basic block. Alternatively, the estimated size of each basic block can be established initially and not recalculated. In step 303, the routine invokes a subroutine to designate a basic block as an initial anchor basic block. In steps 304–306, the routine loops according to a "slinky" algorithm to determine a pair of basic blocks whose permutation will result in a lower metric value for the program image. The algorithm is referred to as "slinky" because during each-iteration the non-anchor basic block of the pair is designated as the new anchor basic block. Thus, a newly designated anchor basic block is based on the metric values associated with the previous anchor basic block. In step 304, the routine invokes a subroutine to find the basic block that, along with the anchor basic block, delimits a range whose permutation results in the lowest metric value. The invoked subroutine returns an indication of the permutation as a temporary layout of the program image. In step 305, if the found basic block and the anchor basic block delimit the same range as the last range delimited, then the routine continues at step 307, else the routine continues at step 306. If the found basic block was designated as the anchor basic block just before the current anchor basic block was designated, then the current range delimited by the anchor basic block and the found basic block is the same as the last range found. That is, when the same range is found twice in a row, then that range is the range that the slinky algorithm identifies as best to permute during this iteration given the initial anchor basic block. In step 306, the routine sets the anchor basic block to the found basic block and loops to step 304. In step 307, the routine sets the current layout to the temporary layout associated with the current anchor basic block and the found basic block. In step 308, the routine determines whether the termination condition of the incremental improvements is satisfied. In step 309, if the termination condition is satisfied, then the routine is done, else the routine loops to step 301. In one embodiment, the routine can perform the processing of steps 303–306 multiple times for each loop through steps 301–309. That is, the routine may perform the slinky algorithm multiple times for different initial anchor basic blocks for each incremental improvement step. Since the designation of the initial anchor block is based on a random selection of basic blocks, different initial anchor basic blocks are typically designated each of the multiple times. The routine then selects the layout with the lowest metric value as the result of this incremental improvement step. The execution of the slinky algorithm multiple times may be useful during the first few incremental steps so that the layout with the best metric value out of many layouts is selected to further improve its working set.

Several different termination conditions can be used to terminate the incremental improvements. The termination conditions may include the number of iterations, the amount of time spent, the attaining of a fixed metric value, and the rate of change of the metric value. If the termination condition is based on the number of iterations, then the number can be empirically derived by evaluating the results of many runs of the algorithm. Such an evaluation could include reviewing the metric value of the current layout after each iteration. However, terminating the algorithm in such a way assumes that there is a strong degree of regularity between the optimizations of different program layouts. Such assumption can be justified in certain circumstances, such as during the development of a computer program in which an executable is generated and optimized, for example, on a daily basis. The termination condition based on a fixed amount of time may be desirable in development environments. When developing a computer program a certain amount of time may be allocated for the building of a new executable file. The allowing of a fixed amount of time for this optimization algorithm can be desirable so that daily development can be appropriately scheduled. When the termination condition is based upon attaining fixed metric value, a problem arises if the algorithm never reaches that metric value. However, such an approach can be used in combination with a termination condition based on a number of iterations or amount of time spent. A termination condition based upon the rate of improvement of the metric value needs to take into consideration that the decrease is not monotonic. The determination of the rate of improvement may require smoothing the values in some fashion in order to avoid terminating prematurely.

Figure 4:
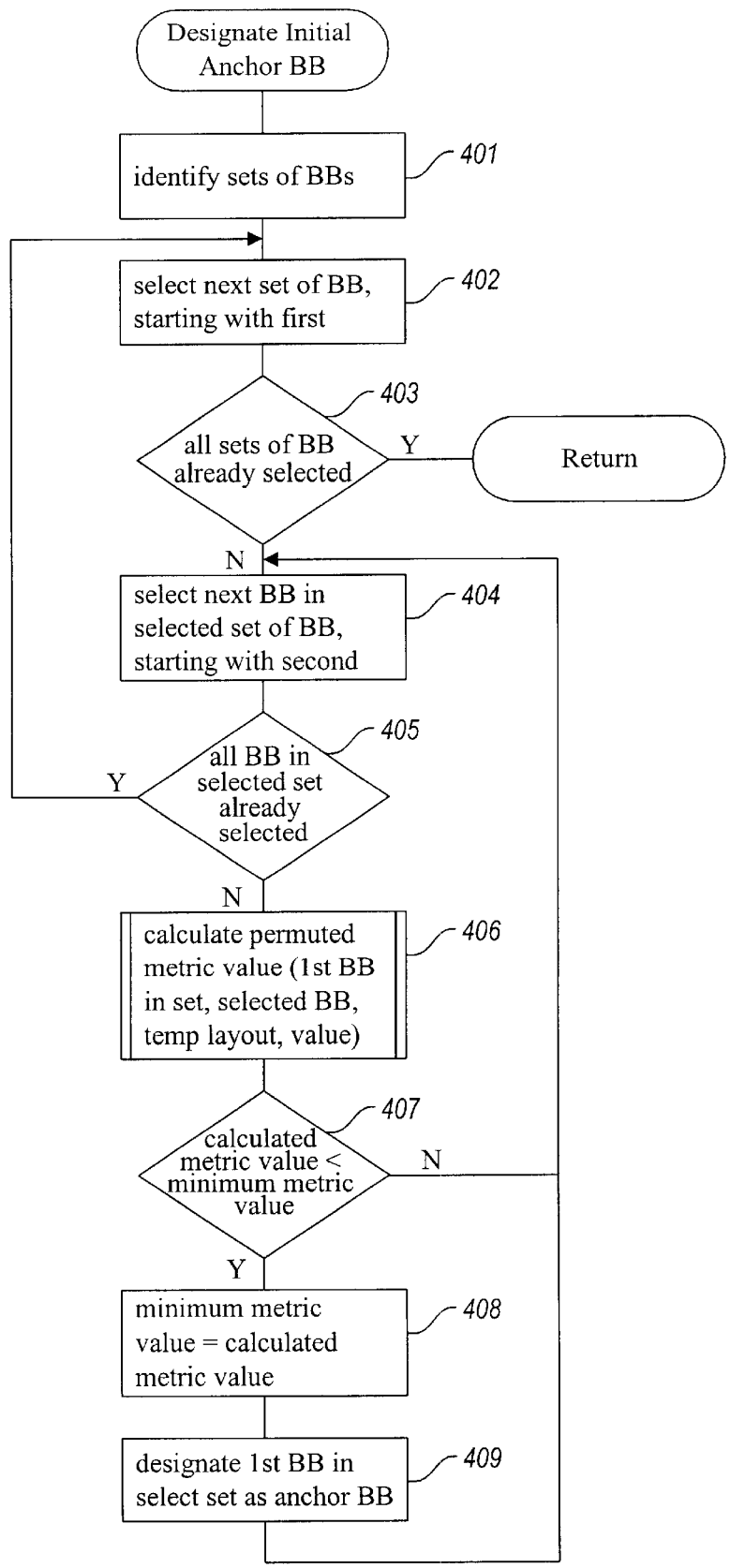
FIG. 4 is a flow diagram of an implementation of a routine that designates an initial anchor block for an iteration.

FIG. 4 is a flow diagram of an implementation of a routine that designates an initial anchor block for an iteration. The routine randomly generates pairs of basic blocks and evaluates the effect on permuting the range of basic blocks delimited by that pair. The routine then designates as the anchor basic block one of the end basic blocks of the range whose permutation would result in the best improvement on the working set. In step 401, the routine identifies various sets of basic blocks. Each set of basic blocks contains a predefined number of basic blocks. Each set defines N−1 pairs of basic block, where N is the number of basic blocks in the set. Each pair of basic block includes the first basic block in the set and one other basic block from the set. In one embodiment, the basic blocks of each set are randomly selected from the basic blocks of the program image. In steps 402–409, the routine loops selecting sets of basic blocks and identifying the pair of basic blocks that delimit a range whose permutation would result in a lowest metric value of all the ranges delimited by the pairs. In step 402, the routine selects the next set of basic blocks starting with the first set of basic blocks. In step 403, if all the sets of basic blocks have already been selected, then the routine returns the currently designated anchor basic block, else the routine continues at step 404. In steps 404–409, the routine loops comparing the metric values associated with the permutation of the ranges that begin with the first basic block and end with each of the other basic blocks in the set. If any of the metric values associated with those permutations are the lowest metric values yet determined, then the routine selects one of the end basic blocks of that range to be returned as the designated anchor basic block. In step 404, the routine selects the next basic block in the selected set of basic blocks starting with the second basic block in the set. In step 405, if all the basic blocks in the selected set have already been selected, then the routine loops to step 402 to select the next set of basic blocks, else the routine continues at step 406. In step 406, the routine invokes a routine to calculate the metric value for the permutation of the range delimited by the first basic block and the selected basic block in the set. In step 407, if the calculated metric value is less than the minimum metric value that has been calculated so far, then the routine continues at step 408, else the routine loops to select the next basic block in the selected set of basic blocks. In step 408, the routine sets the minimum calculated metric value so far to the currently calculated metric value. In step 409, the routine designates the first basic block in the selected set as the anchor basic block and loops to step 404 to select the next basic block in the selected set.

Figure 5:
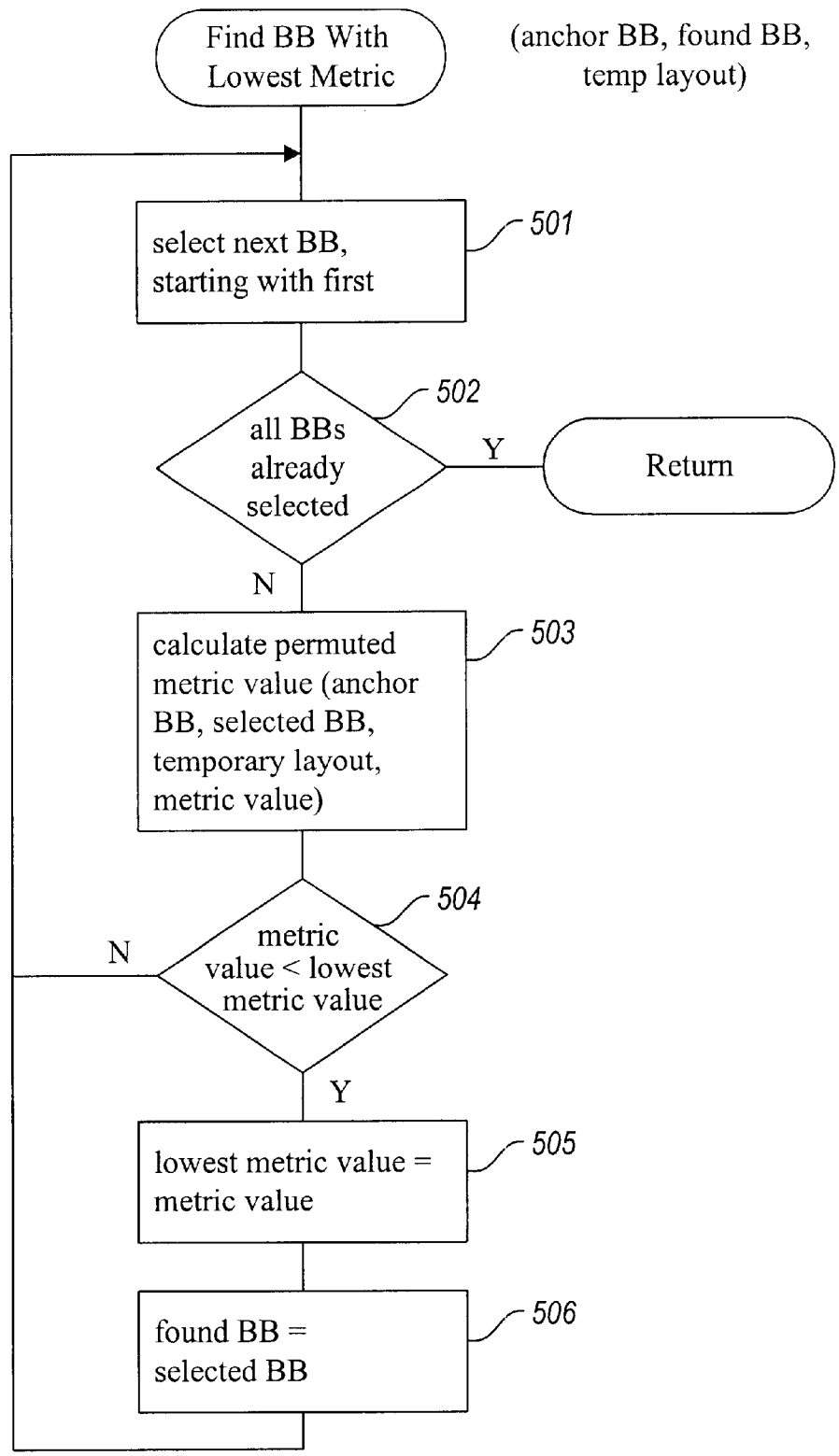
FIG. 5 is a flow diagram of an implementation of a routine to find a basic block with the lowest metric value.

FIG. 5 is a flow diagram of an implementation of a routine to find a basic block with the lowest metric value. The routine is passed an anchor basic block. The routine compares the ranges of basic blocks starting at that anchor basic block and ending at each other basic block in the program image. That other basic block that delimits a range whose permutation would result in a lowest metric value is returned. In step 501, the routine selects the next basic block in the program image starting with the first basic block. In step 502, if all the basic blocks in the program image have already been selected, then the routine returns the currently found basic block, else the routine continues at step 503. In step 503, the routine invokes a routine to calculate the metric value of the program image when the selected range is permuted. In step 504, if the metric value for the program image with the permuted range is less than the lowest metric value calculated so far for a permuted range, then the routine continues at step 505, else the routine loops to step 501 to select the next basic block in the program image. In step 505, the routine sets the lowest metric value to the calculated metric value. In step 506, the routine sets the found basic block to the selected basic block and loops to step 501 to select the next basic block.

It has been empirically observed that, at the beginning of the incremental layout algorithm, the distance between the anchor basic block and the other basic block that delimits the range with the lowest metric value can be quite large. However, as the algorithm proceeds, the average distance between the anchor basic block and the other basic block that delimits the range with the lowest metric value is gradually reduced. Thus, as the algorithm proceeds, it is less likely that the other basic block that delimits the range with the lowest metric value will be a large distance from the anchor basic block. To take advantage of this observation, the system limits the search for the other basic block that delimits the range with the lowest metric value to a progressively smaller distance from the anchor basic block. The initial search distance may be set to either the total number of basic blocks, a fixed number of basic blocks, or a fixed fraction of the total number of basic blocks. However, if the system detects that the average distance between the anchor basic block and the other basic block that delimits the range with the lowest metric value is decreasing, then the system decreases the search distance. For example, distances may be specified in terms of number of basic blocks. The system can determine whether the actual distance is decreasing by checking the number of basic blocks for a predefined number (e.g., 5) of searches to find the other basic block. If the number of basic blocks in the range is less than a threshold distance for each of the searches, then the system decreases the search distance. The system reduces the number of basic blocks in the search distance by a predefined ratio and in the threshold distance by the same ratio. Table 1 illustrates the decreasing of the search distance.

TABLE 1

| search number | search distance | threshold distance | actual distance |
|---|---|---|---|
| 55 | 20 | 10 | 14 |
| 56 | 20 | 10 | 9 |
| 57 | 20 | 10 | 12 |
| 58 | 20 | 10 | 7 |
| 59 | 20 | 10 | 2 |
| 60 | 20 | 10 | 6 |
| 61 | 20 | 10 | 8 |
| 62 | 20 | 10 | 6 |
| 63 | 14 | 7 | 3 |
| 64 | 14 | 7 | 9 |

In the example of this table, the predefined number of previous searches is 5; the threshold distance is one-half of the search distance; and the reduction ratio is 0.7. The system uses 20 as the number of basic blocks in the search distance and uses 10 as the threshold distance for searches 55–62. After search 62, the 5 previous searches had an actual distance that was less than the threshold distance of 10. Therefore, the search distance the threshold distance is reduced by the reduction ratio from 20 to 14 and the threshold distance is reduced to 7. One skilled in the art would appreciate that many techniques can be used to establish the search distance. The particular technique selected can be based on a tradeoff between the amount of time allocated to searching versus the desired amount of improvement in the working set.

Figure 6:
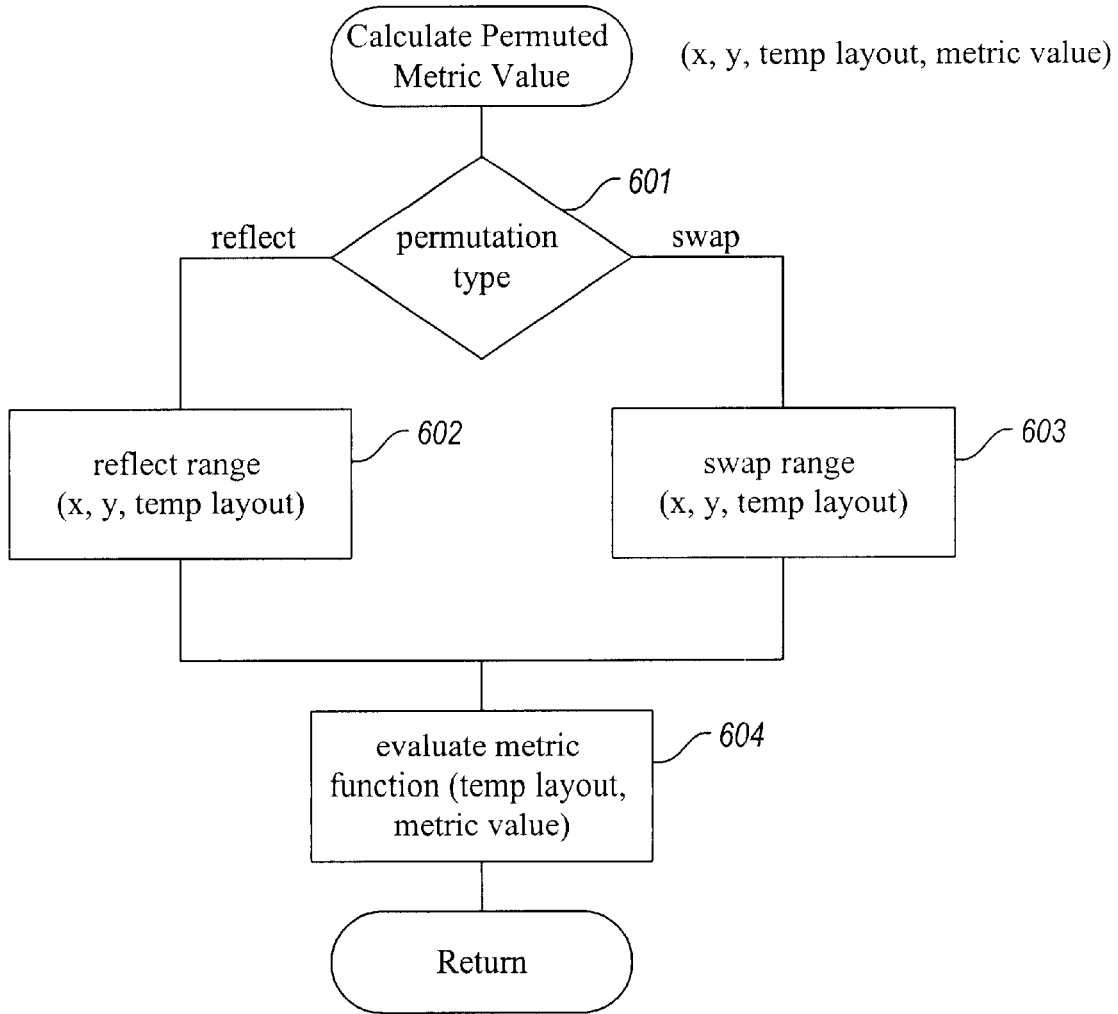
FIG. 6 is a flow diagram of an implementation of a routine to calculate a metric value when a range is permuted.

FIG. 6 is a flow diagram of an implementation of a routine to calculate a metric value when a range is permuted. The routine is passed a range, permutes that range according to the current permutation type, and returns a metric value for the program image with the range permuted and a temporary layout with the range permuted. In step 601, if the permutation type is reflect, then the routine continues at step 602, else the permutation type is swap and the routine continues at step 603. In steps 602 and 603, the routine performs the appropriate permutation on the passed range and generates a temporary layout of the program image. In step 604, the routine evaluates the metric function for the temporary layout to generate the metric value and returns.

Figure 7:
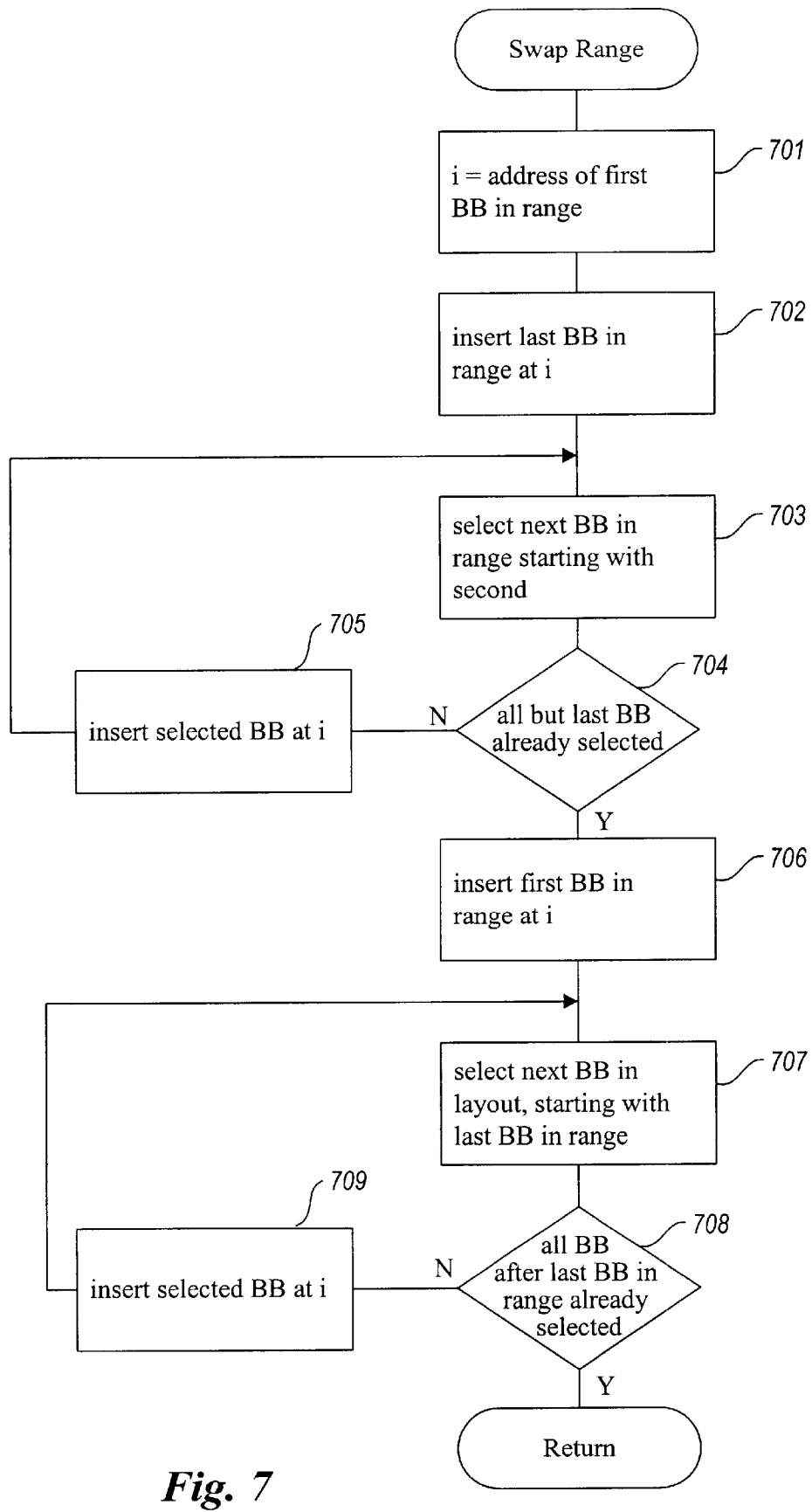
FIG. 7 is a flow diagram of an implementation of a routine to swap a range of basic blocks.

FIG. 7 is a flow diagram of an implementation of a routine to swap a range of basic blocks. The routine is passed an indication of the basic blocks that delimit the range and returns a temporary layout with the basic blocks of the range swapped. (The routine to reflect a range of basic block is not described in detail, but is analogous to this routine.) In step 701, the routine sets variable i equal to the address of the first basic block in the range. The first basic block in the range is the passed basic block with a lower address value. The routine also sets the portion of the temporary layout below address i to the same layout as the current layout of the program image. In step 702, the routine inserts the last basic block in the range at address i. The "insertion" of a basic block at an address involves several steps. In the first step, the routine determines the alignment constraint of the basic block. In a second step, the routine adds sufficient padding to ensure that the alignment constraint is satisfied. In the last step, the routine increments the variable i to point to the address of the next available memory location. In steps 703–705, the routine loops inserting the basic blocks from within the range to the temporary layout. In step 703, the routine selects the next basic block in the range starting with the second basic block in the range. In step 704, if all but the last basic block in the range have already been selected, the routine continues at step 706, else the routine continues at step 705. In step 705, the routine inserts the selected basic block at the address indicated by variable i and loops to step 703 to select the next basic block in the range. In step 706, the routine inserts the first basic block in the range at the address indicated by variable i. This completes the swap of the first basic block in the range and the last basic block in the range. In steps 707–709, the routine loops inserting the basic blocks after the range into the temporary layout. In step 707, the routine selects the next basic block in the layout starting with the first basic block after the last basic block in the range. In step 708, if all the basic blocks after the last basic block in the range in have already been selected, then the routine returns, else the routine continues at step 709. In step 709, the routine inserts the selected basic block at the address indicated by variable i and loops to step 707 to select the next basic block after the last basic block in the range.

Figure 8:
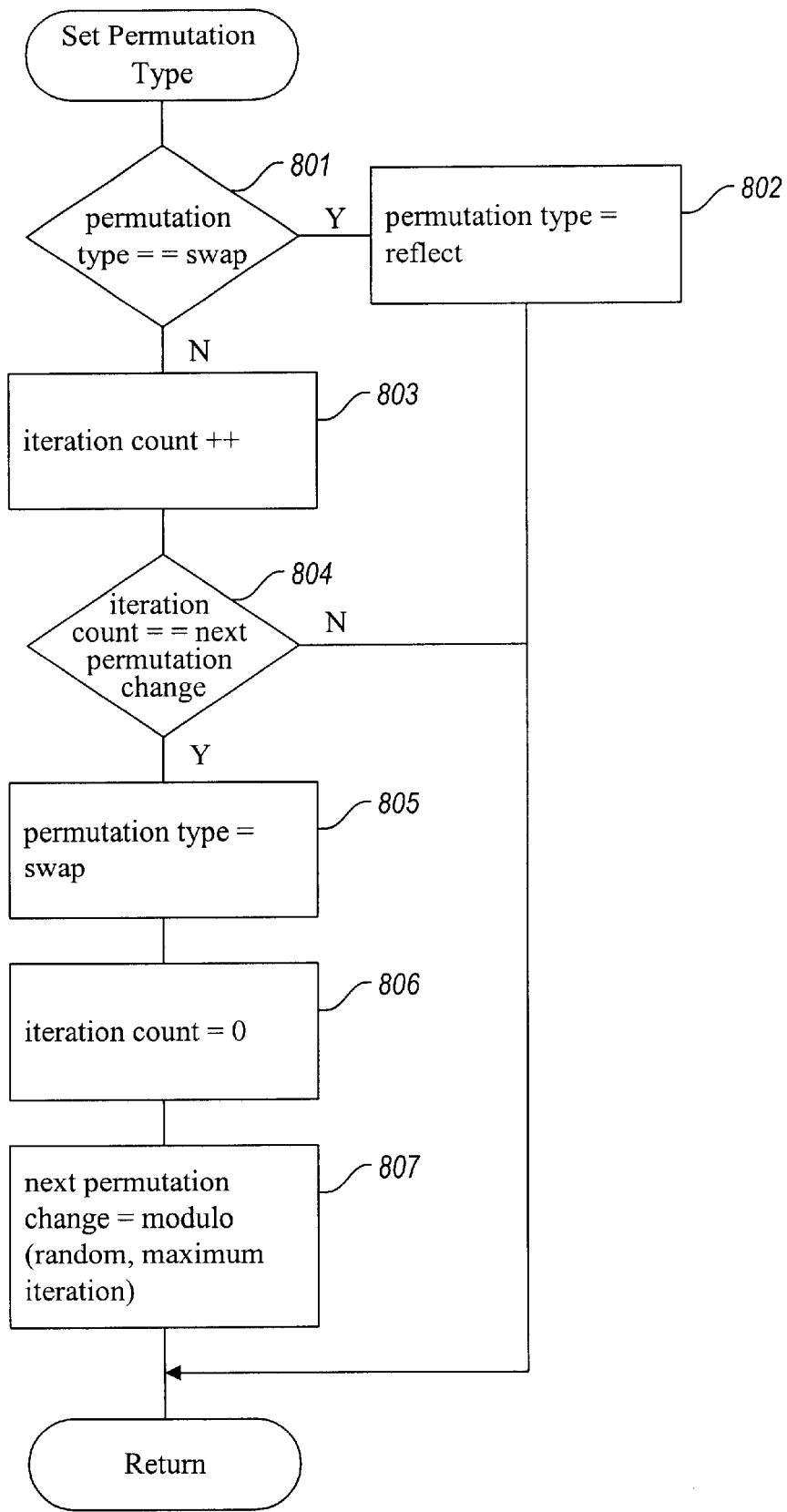
FIG. 8 is a flow diagram of an implementation of a routine that sets the permutation type for the next iteration of the incremental improvement.

FIG. 8 is a flow diagram of an implementation of a routine that sets the permutation type for the next iteration of the incremental improvement. This routine repeatedly sets the permutation type to reflect for a random number of iterations in sequence and then sets the permutation type to swap for one iteration. In step 801, if the current permutation type is swap, then the one iteration with the permutation type set to swap has been completed and the routine continues at step 802, else the routine continues at step 803. In step 802, the routine sets the permutation type to reflect and returns. In step 803, since the current permutation type is reflect, the routine increments the iteration count. The iteration count indicates the number of iterations in a row for which the permutation type has been set to reflect. In step 804, if the iteration count is equal to the next permutation type change, then the routine continues at step 805 to change the permutation type to swap, else the routine returns. The next permutation type change indicates the number of iterations until the permutation type is to be changed to swap. In step 805, the routine sets the permutation type to swap. In step 806, the routine resets the iteration count equal to zero. In step 807, the routine sets the next permutation type change equal to the modulo of a random number and a maximum number of iterations. Such a setting indicates that the permutation type will be changed after a random number of iterations that is less than the maximum number of iterations. The routine then returns.

To account for the alignment constraints of the basic blocks, the system calculates the aligned sizes of the basic blocks. The aligned size of a basic block is the size of the basic block plus the additional padding needed to satisfy any alignment constrain. To rapidly calculate the aligned size, the system maintains a table for each basic block from which can be derived the aligned size. The table maps from the starting address of the basic block modulo the alignment constraint to the aligned size. The table for a basic block is updated whenever the estimated size of a basic block changes. Table 2 illustrates the table for a basic block with an estimated size of 13 and with an alignment constraint of 8.

TABLE 2

| remainder | aligned size |
|---|---|
| 0 | 13 |
| 1 | 20 |
| 2 | 19 |
| 3 | 18 |
| 4 | 17 |
| 5 | 16 |
| 6 | 15 |
| 7 | 14 |

To find the aligned size of the basic block, the system takes a starting address of the basic block modulo 8 and uses the remainder as an index into the table. For example, if the starting address of the basic block is 260, then the system uses the remainder of 4 (i.e. 260 modulo 8) to retrieve the aligned size of 17. The system then adds the aligned size to the current address to generate the address for the next basic block in the layout. Alternatively, rather than having a table for each basic block, the system can maintain one table for each possible combination of estimated size and alignment constraint.

In one embodiment, the system initially combines basic blocks with the same temporal usage pattern into a single aggregate basic block to reduce the number of basic blocks. When an aggregate basic block has more than one basic block with an alignment constrain, the relationship between the starting address and the aligned size of the aggregate basic block can be complex. In such a case, the size of each table needs to be equal to the largest alignment constraint of the basic blocks in the aggregate, and the values in the table are based on all of the alignment constraints in the aggregate basic block. Table 3 illustrates the sample alignment constraints for an aggregate basic block.

TABLE 3

| Basic block | Estimated Size | Alignment constraint |
|---|---|---|
| 0 | 3 | |
| 1 | 8 | 8 |
| 2 | 3 | |
| 3 | 4 | 2 |
| 4 | 3 | |

In this example, there are five basic blocks and two of the basic blocks, basic blocks 1 and 3, have alignment constraints of 8 and 2, respectively. The total of the estimated sizes is 21. Table 4 shows the table that corresponds to this aggregate block.

TABLE 4

| remainder | aligned size |
|---|---|
| 0 | 27 |
| 1 | 26 |
| 2 | 25 |
| 3 | 24 |
| 4 | 23 |
| 5 | 22 |
| 6 | 29 |
| 7 | 28 |

In this example, if the starting address modulo 8 is 5, then the alignment constraint of basic block 1 is satisfied. However, when the alignment constraint of the basic block 1 is satisfied, the alignment constraint of basic block 3 is not satisfied. Whenever the alignment constraint of the basic block 1 is satisfied, one additional location of padding needs to be placed between the basic block 1 and the basic block 3 for the alignment constraint of the basic block 3 to be satisfied. Thus, the aggregate basic block has an aligned size of 22 rather than 21.

Figure 9:
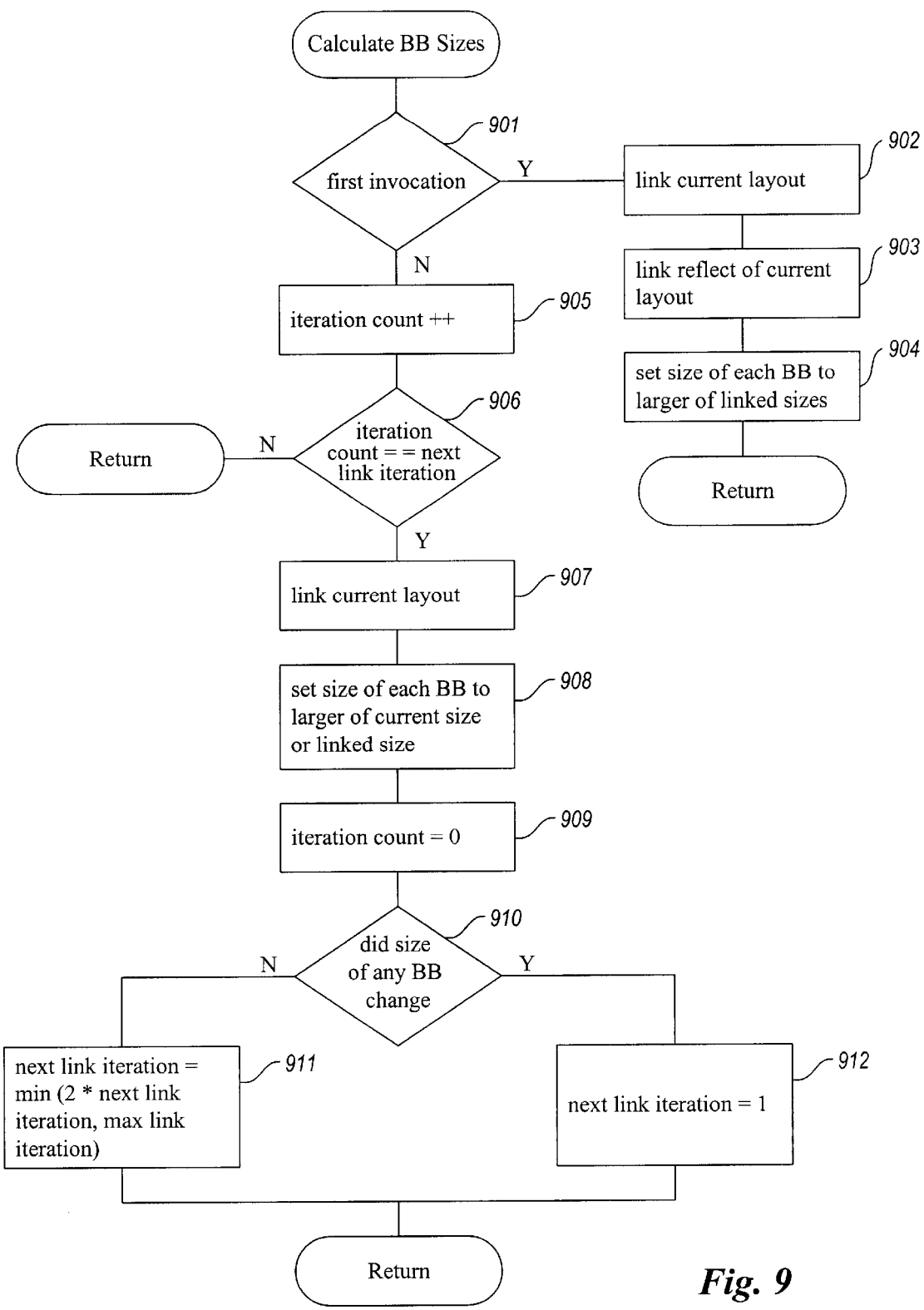
FIG. 9 is a flow diagram of an implementation of a routine to calculate the estimated sizes of the basic blocks.

FIG. 9 is a flow diagram of an implementation of a routine to calculate the estimated sizes of the basic blocks. The routine invokes the linker to establish the estimated size of each basic block. When the routine is initially invoked, it establishes the estimated size by invoking the linker twice: once with the initial program layout and once with the initial program layout reflected. The estimated size of a basic block is set to the larger of the sizes of that basic block. The routine then periodically invokes the linker. If the estimated size of a basic block has changed, then the routine sets an indication to invoke the linker on the next invocation of the routine. If, however, no estimated sizes were changed, then the routine sets an indication that the linker would double the number of invocations of the routine until the linker is next invoked. In this way, the linker is invoked increasingly less often. In step 901, if this is the first invocation of this routine, then the routine continues at step 902, else the routine continues at step 905. In step 902, the routine invokes the linker to link the current layout. In step 903, the routine invokes the linker to link the reflection of the current layout. In step 904, the routine sets the estimated size of each basic block to the larger of the linked sizes and returns. In step 905, the routine increments the iteration count. The iteration count indicates the number of iterations since the current layout was last linked. In step 906, if the iteration count is equal to the next link iteration, then the routine continues at step 907, else the routine returns. The next link iteration indicates the number of iterations between linking the current layout. In step 907, the routine links the current layout. In step 908, the routine sets the estimated size of each basic block to the larger of the current estimated size and the actual size of the basic block in the linked layout. In step 909, the routine sets the iteration count to zero. In step 910, if the estimated size of any basic block has changed as a result of the linking, then the routine continues at step 912, else the routine continues at step 911. In step 911, the routine sets the next link iteration to the minimum of the current value of the next link iteration doubled and the maximum number of link iterations and returns. In step 912, the routine sets the next link iteration to 1 and returns.

The system maintains a table of estimated sizes that has an entry for each basic block. Initially, the table contains the size as designated by the initial program layout. However, the system periodically invokes the linker to link the current layout. This linking results in adjustments to the estimated size of basic blocks. After the linker completes, the system updates the estimated size of any basic block in the program image to the maximum of the value currently in the table and the value calculated by the linker. Since linking is a computationally intensive procedure, the system only periodically invokes the linker. In particular, the number of iterations between linking is set to increase exponentially, up to a predefined limit, on each link that does not result in the increase in the estimated size of a basic block. When a link does result in the change, of the estimated size of a basic block, then the linking frequency is reset to a starting value, which is typically once per iteration. FIG. 10 illustrates the frequency of invoking of the linker. Initially, the linker is called after the first iteration. If the estimated size of a basic block changes, then the linker is scheduled to be invoked on the next iteration. However, if the estimated size of the basic block does not change, then the linker is scheduled to be invoked two iterations later. If the next time the linker is invoked the estimated size of a basic block again does not changed, then the linker is scheduled to be invoked four iterations later. At any point, in which the estimated size of a basic block changes, then the linker is invoked at the next iteration.

In one embodiment, the initial sizes of the basic blocks are established by invoking the linker for the initial layout and then reflecting the entire program image and again invoking the linker on the reflected program layout. The size of each basic block in the table is set to the larger of the two values. This process of initialization of the size of the basic block has been empirically found to reduce the need to invoke the linker during the iterations of the algorithm.

Figure 11:
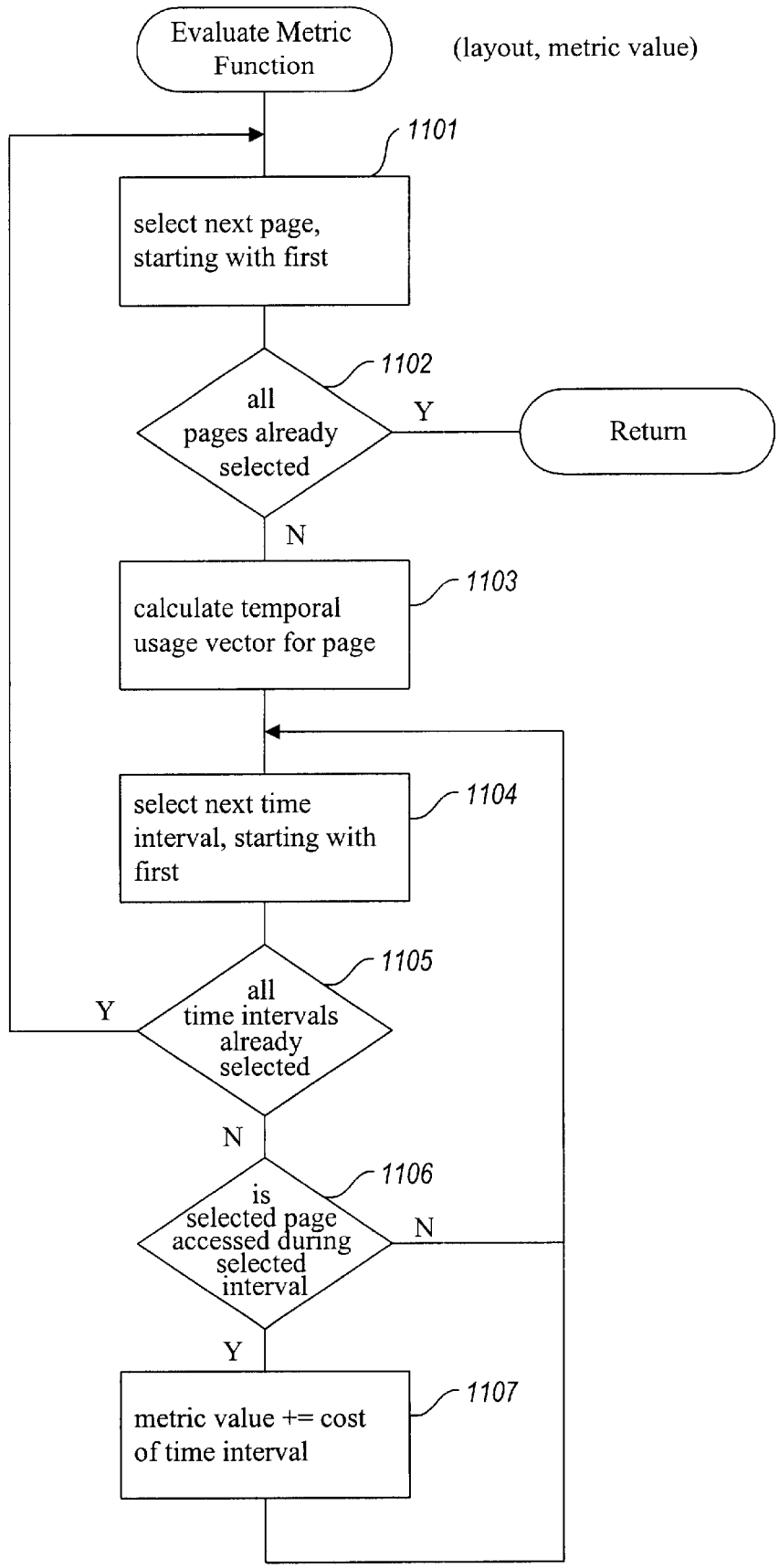
FIG. 11 is a flow diagram of an implementation of a routine to evaluate the metric function.

FIG. 11 is a flow diagram of an implementation of a routine to evaluate the metric function. The routine is passed a layout of a program image and returns the metric value associated with that layout. The layout includes the starting location of each basic block and the temporal usage vector of each basic block. In step 1101, the routine selects the next page of the layout starting with the first. In step 1102, if all the pages have already been selected, then the routine returns with the metric value, else the routine continues at step 1103. In step 1103, the routine calculates the temporal usage vector for the selected page. The temporal usage vector for a page is the logical-OR of the temporal usage vectors for each basic block that is at least partially on the page. In steps 1104–1107, the routine loops adding the cost of each time interval in which the selected page is accessed to the total metric value. The cost is determined by the metric that is selected for optimization, as described in detail below. In step 1104, the routine selects the next time interval starting with the first time interval. In step 1105, if all the time intervals have already been selected, then the routine loops to step 1101 to select the next page, else the routine continues at step 1106. In step 1106, if the selected page is accessed during the selected time interval (i.e., if the temporal usage vector of the selected page has a 1 in the bit position corresponding to the selected time interval), then the routine continues at step 1107, else the routine loops to step 1104 to select the next time interval. In step 1107, the routine increases the total metric value by the cost associated with the selected time interval and loops to step 1104 to select the next time interval.

Figure 12:
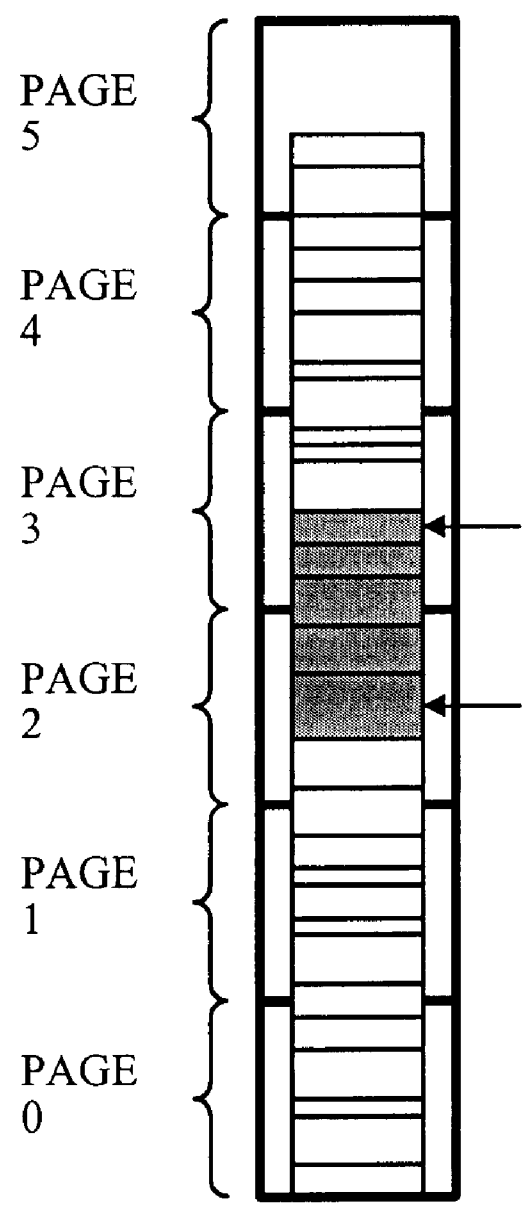
FIG. 12 is a diagram illustrating the permutation of basic blocks.

The calculation of the metric value for a program image can be computationally intensive. Thus, in one embodiment, the system reduces the number of computations by saving results from previous computations. In particular, the system can use the metric values previously calculated for pages that are at lower memory address than the range of basic blocks to be permuted. FIG. 12 is a diagram illustrating the permutation of basic blocks. In this example, the range to be permuted is entirely within pages 2 and 3, therefore, there is no need to recalculate the metric values for pages 0 and 1 since they will be the same as they were when last calculated. The metric values for pages 4 and 5 need to be recalculated if the alignment constraints have caused a change in the size of the permuted range of basic blocks. However, the system preferably ignores any range of basic blocks that when permuted will not yield an improved metric value for the pages involved in the permutation without bothering to determine the effect on the metric value of the remainder of the program image. Thus, if the metric value for the pages involved in the permutation is not improved, the routine that evaluates the metric function returns a very high metric value so that this range will not be permuted.

In one embodiment, the system coalesces adjacent time intervals that have temporal usage vectors that contains the same value for each basic block. That is, each adjacent time interval that has the same usage pattern for every basic block as the previous time interval can be represented by a single value for each basic block. This coalescing reduces the amount of memory need to represent the temporal usage vectors. Table 5 illustrates the coalescing of time intervals.

TABLE 5

| count   | 1 | 2 | 2 | 3 | 2 | 1 | 1 | 2 | 1 | 1 |
|---------|---|---|---|---|---|---|---|---|---|---|
| block 0 | 1 | 1 | 0 | 1 | 0 | 1 | 0 | 0 | 0 | 1 |
| block 1 | 1 | 0 | 1 | 1 | 0 | 1 | 1 | 0 | 0 | 0 |
| block 2 | 1 | 0 | 1 | 0 | 1 | 0 | 0 | 0 | 1 | 1 |
| block 3 | 1 | 1 | 1 | 0 | 0 | 1 | 0 | 0 | 1 | 0 |

This example represents 16 time intervals that have been coalesced. Each temporal usage vector has 16 values represented by only 10 values. The count in the table indicates the number of adjacent time intervals in which each basic block has the same usage. For example, a count of 2 in the second column indicates that the second and third time intervals have the same temporal usage for each basic block. That is, basic block 1 is accessed in the second and third time intervals, basic block 2 is not accessed in the second and third time intervals, and so on. When the time intervals are coalesced, the weights associated with the coalesced time intervals can be added to give a coalesced weight. The system can then perform the algorithm using the coalesced number of time intervals, rather than the actual number of time intervals. If the chosen metric does not depend on the ordering of the time intervals, then this coalescing need not be restricted to adjacent time intervals, but rather can include all time intervals that have the same usage pattern for every basic block, irrespective of their order.

In the following, a description and analysis of various metric functions are provided. Various different metric functions as described below can be used to evaluate the working set size associated in a layout. When modifying the page layout of a program image, a metric is needed to indicate the working set size for the modified page layout. The metric can be a function that is passed the page layout and returns a metric value that rates the passed page layout. The goal of a page layout optimization algorithm is to generate, in a reasonable amount of time, a page layout that has a low metric value (e.g., a small working set). Many different functions can be used to rate a page layout. The weighted space-time product function and the exponentially decaying run-length function have been effective for evaluating the page layouts. The metric value calculated by each of these functions is the linear summation of a metric value calculated for each page within the program image. The following equation illustrates this linear summation.

$$\text{Metric value} = \sum_{p=0}^{P-1} f(p)$$

where P is the number of pages in the program image and $f$ is the metric function.

The weighted space-time product function is derived from a space-time product function. The space-time product function returns the sum of the number of pages accessed during each time interval. The following equation illustrates the space-time product function for page p.

$$f_{stp}(p) = \sum_{t=0}^{T-1} \text{Temporal Usage Vector } [p, t]$$

where T is the number of time intervals and the temporal usage vector indicates for each page p whether it is accessed in each time interval temporal. The temporal usage vector for a page is calculated by taking the logical-OR of the temporal usage vector for each basic block that is wholly or partially on the page. FIG. 13A illustrates sample temporal usage vectors for basic blocks 0–5 for 16 time intervals. For example, basic block 2 is accessed during time interval 4 as indicated by the "1" in the temporal usage vector for basic block 2 at time interval 4, and basic block 2 is not accessed during time interval 6 as indicated by the "0" as the bit for time interval 6 in the temporal usage vector for basic block 2.

FIG. 13B illustrates the temporal usage vector for a page that contains basic blocks 0 and 1. The third row represent the temporal usage vector for the page, which is the logical-OR of the temporal usage vector for basic blocks 0 and 1. For example, as indicated by the temporal usage vectors, basic block 0 is accessed during time interval 15 and basic block 1 is not accessed during time interval 15. Thus, the bit for time interval 15 for the temporal usage vector of the page is set to 1 to indicate that the page that contains basic blocks 0 and 1 is accessed during time interval 15. Thus, the space-time product function of a program image can be calculated by summing the number of bits in each temporal usage vector of each page in the program image and adding those sums together. If the space-time product of a program image is divided by the number of time intervals, then the result is the average number of pages that are used during each time interval for the program image.

The space-time product function assumes that the cost associated with each time interval is equal. That is, the resulting metric value is the same whether nine pages are used during one time interval and one page is used during the next time interval, or whether five pages are used during each time interval. However, there may be time intervals in which the use of a very small number of pages in memory may be important, and other time intervals when the use of a large number of pages may be acceptable. For example, when a program first starts executing, it is typically important to provide feedback to the user very quickly. Therefore, it may be desirable to have program images that use very few pages during initial start up of the computer program. The weighted space-time product function assigns a weight to each time interval to account for the importance of the number of pages used during that time interval. FIG. 14C is a table showing sample weights allocated for each time interval. In this example, time interval 0 and 1 have been allocated a weight of 5 and time intervals 8–11 have been each allocated a weight of 2, all other time intervals have been assigned a weight of 1. The following is the equation for the weighted space-time product function.

$$f_{wstp}(p) = \sum_{t=0}^{T-1} \text{Temporal Usage Vector } [p, t] * \text{weight } [t]$$

Where weight [t] is the weight for time interval t. FIG. 13D illustrates a sample calculation of the weighted space-time product for the page that contains basic blocks 0 and 1. Line #1301 represents the temporal usage vector for the page, and line #1302 represents the weights for each time interval. Line #1303 represents the product of the value of the temporal usage vector at each time interval times the weight at each time interval. In this example, the weighted space-time product for the page that contains basic blocks 0 and 1 is 21.

The space-time product functions accurately represent the usage of memory space under the assumption that a memory page is not resident if it is not required to be resident. However, this assumption is typically not valid. In general, a paging system will not remove (i.e., not swap out) a page from memory immediately after it is referenced. Rather, the paging systems only remove pages when the page frame that contains the memory page is needed by other portions of the program or by another program in the system. However, in general, the longer a page goes unaccessed, the less likely it is that the page will remain in memory.

The space-time product functions are binary metric functions that are non-length-sensitive. That is, when a page is required to be in memory during a time interval, its metric value is equal to the weight of that time interval; otherwise its metric value is zero regardless of whether it was required in the previous time interval. Other metric functions may assign some non-zero value to each time interval for which a page is not required. A linear metric function assigns a linearly reduced value to each page up to a limit of zero. A quadratic metric function assigns a quadratically reduced value to each page up to a limit of zero. An exponentially metric function assign an exponentially reduced value to each page up to a limit of zero.

Figure 14:
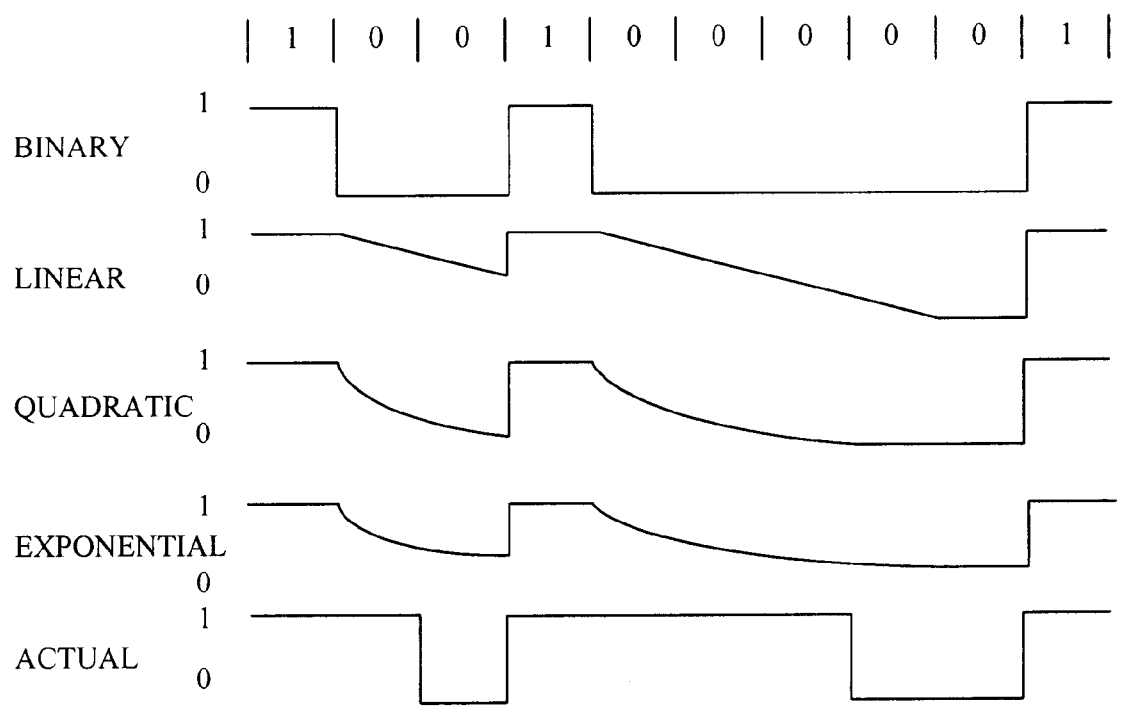
FIG. 14 illustrates a graph of metric values versus time intervals of various metric functions.

FIG. 14 illustrates a graph of metric values versus time intervals of each of the metric functions. Each metric function produces a value of 1 for each time interval in which the page is accessed. However, their produced values differ in the time intervals in which the paged is not accessed. In such time intervals, the metric value produced by the binary metric is 0. The metric values produced by the other metric functions vary linearly, quadratically, and exponentially from 1 to a limit of 0 between the time intervals in which the page was accessed. Ideally, the metric function should yield a value of 1 full value for all time intervals during which the page remains resident, and a value of 0 for those time intervals during which the page is no longer resident. The actual metric function produces such values. Unfortunately, the residency status of an unneeded page is virtually impossible to determine. One could examine all other pages in the program image and base such a determination on how many other pages are required to be resident during the same time interval. However, this is an extremely computationally intensive process, and it can only be performed when the entire layout is known. Furthermore, if there will be other processes executing on the computer system concurrently with the program, such an analysis would not be able to take these other processes into consideration.

However, one can model the ejection (i.e., swapping out) of a page from primary storage as a memoryless random process. According to this model, there is some constant probability that a page will be swapped out during any time interval that it is not required. The probability that a page has been swapped during a sequence of open time intervals is thus given by a exponential metric function of the amount of time that has transpired since the page was last required. Even though an exponential metric function appears similar to the quadratic metric function, it always produces a non-zero value for each time interval (other than those prior to the first time interval in which the page is required). Such a non-zero value is desirable because there is always some probability that the page will still be resident once it has been loaded into memory. The following is an equation representing an exponentially decaying run-length metric function.

$$f_{\exp}(p) = \sum_{t=0}^{T-1} \text{Residence Probability } [p, t] * \text{weight } [t]$$

where Residence Probability is the probability that page p is in memory during time interval t. If the probability that a page is ejected during each time interval is 1−α, then the residence probability is $\alpha^n$, where n is the number of time intervals since the page was required.

In one embodiment, the system precalculates the metric values for adjacent groups of time intervals. Such precalculation reduces the number of computations needed to calculate the metric value for a page. For example, any group of four successive time intervals have 16 possible temporal usage patterns. The system pre-calculates the resulting metric value for each of the 16 possible temporal usage patterns. The number of time intervals in a group is based on the desired tradeoff between computation speed and table size needed to store the pre-calculated metric values. For example, the use of 8-time interval groups speeds up the computation by a factor of 8 and requires 256 entries in the table, whereas the use of 16-time interval groups speeds up the computation by a factor of 16, but requires 65,536 entries in the table. Table 6 illustrates 4-time interval groups for 16 time interval patterns for the temporal usage vectors of FIG. 13A and the time interval weights of FIG. 13C.

TABLE 6

| bit pattern | bits 0–3 | bits 4–7 | bits 8–11 | bits 12–15 |
|---|---|---|---|---|
| 0000 | 0  | 0 | 0 | 0 |
| 0001 | 1  | 1 | 2 | 1 |
| 0010 | 1  | 1 | 2 | 1 |
| 0011 | 2  | 2 | 4 | 2 |
| 0100 | 5  | 1 | 2 | 1 |
| 0101 | 6  | 2 | 4 | 2 |
| 0110 | 6  | 2 | 4 | 2 |
| 0111 | 7  | 3 | 6 | 3 |
| 1000 | 5  | 1 | 2 | 1 |
| 1001 | 6  | 2 | 4 | 2 |
| 1010 | 6  | 2 | 4 | 2 |
| 1011 | 7  | 3 | 6 | 3 |
| 1100 | 10 | 2 | 3 | 2 |
| 1101 | 11 | 3 | 6 | 3 |
| 1110 | 11 | 3 | 6 | 3 |
| 1111 | 12 | 4 | 8 | 4 |

As shown, when the first 4 bits of the temporal usage vector are "1100," then the resulting weight is 10, which is the sum of the weights for time intervals 0 and 1. If the second 4 bits of the temporal usage vector are "1100," then the resulting weight is 2, which is the sum of the weights for time intervals 4 and 5. Since the third and fifth columns in Table 6 are identical, they may be combined into a single column in order to reduce the required storage. In general, if any two groups of bits have identical weight values, their precalculated metric values will be the same, allowing them to share storage.

Such pre-calculation of metric values can be used when the metric function is based on a weighted space-time product, because the metric value does not depend upon the basic blocks that were accessed during the previous time interval. However, other possible metric functions, such as the exponentially decaying run-length metric function, generate metric values that do depend on the basic blocks that were accessed in the previous time interval. For such metric functions, the table lookup of Table 6 is not sufficient because the effect on the metric value associated with each time interval may be dependent upon earlier time intervals. In particular, if the metric value associated with a group of time intervals depends on the temporal usage in earlier time intervals, then the metric value cannot be represented as a single value.

To accommodate such dependencies, the system uses a state machine which processes each of the groups of bits of the temporal usage vector in turn. The system uses each group of bits to retrieve from a table four values: the dependent value (DV) of the bit group, the independent value (IV) of the bit group, the dependent carry (DC) to the next bit group, and the independent carry (IC) to the next bit group. From these four values and from the carry (C) from the previous bit group can be calculated the value (V) that the current bit group contributes to the metric value and the carry (C) to the next bit group, according to the following difference equations:

$$V_n = C_{n-1} \cdot DV_n + IV_n \quad (1)$$

$$C_n = C_{n-1} \cdot DC_n + IC_n \quad (2)$$

The independent value (IV) of a group is the contribution of the temporal usage represented by the group to the metric value during the time intervals represented by the group. The dependent value (DV) of a group is the weight to be attributed to the contribution of previous time intervals to the metric value during the time intervals represented by the group. The independent carry (IC) of a group is the contribution of the group during the time intervals represented to the group to the metric value of the following time intervals. The dependent carry (DC) of a group is the contribution of the time intervals before the time intervals represented by the group to the metric value of the time intervals after the time intervals represented by the group.

Thus, equation (1) indicates that the metric value for a group of time intervals is the contribution to the metric value from the previous time intervals ($C_{n-1}$) times the dependent value (DV) plus the independent value (IV). Equation (2) indicates that the contribution to the metric value for the following time interval group of time intervals is the contribution to the metric value from the previous time intervals ($C_{n-1}$) times the dependent carry (DC) plus the independent carry (IC).

Table 7 shows the values of the four entries of the lookup table for each of the 16-bit patterns in a 4-time interval group. This table assumes no weighting factors for the time intervals; if there are weighting factors, a separate table is used for each bit group with distinct weight values, and the values of the (DV) and (IV) fields would be correspondingly adjusted. The value of $\alpha$ is a parameter of the exponential rate of the metric function that is equal to one minus the probability that a page will be swapped out of memory during any time interval that it is not required. The equation "$\alpha+\alpha^2+\alpha^3+\alpha^4$" for the dependent value (DV) of bit pattern "0000" indicates how the value is to be calculated. Conceptually, if a basic block is not accessed during the four time intervals of a group, then the contribution to the metric value attributed to those time intervals is the dependent value (DV) times the carried-in value ($C_{n-1}$). For example, if $\alpha$ equals 0.1, the dependent value for this group is 0.1111. If the carried-in value is 0.1, then the metric value for the group would be 0.01111. As another example, if the carried-in value is 0.1, the bit pattern is "0101," and the exponential rate is 0.1, then the metric value for the time intervals represented by the group is (0.1*0.1)+(0.1+0.1)=0.21 and the carried-out value for the time intervals represented by the group is (0.1*0)+0.1=0.1.

TABLE 7

| bit pattern | DV | IV | DC | IC |
|---|---|---|---|---|
| 0000 | $\alpha + \alpha^2 + \alpha^3 + \alpha^4$ | 0 | $\alpha^4$ | 0 |
| 0001 | $\alpha + \alpha^2 + \alpha^3$ | 1 | 0 | 1 |
| 0010 | $\alpha + \alpha^2$ | $1 + \alpha$ | 0 | $\alpha$ |
| 0011 | $\alpha + \alpha^2$ | 2 | 0 | 1 |
| 0100 | $\alpha$ | $1 + \alpha + \alpha^2$ | 0 | $\alpha^2$ |
| 0101 | $\alpha$ | $2 + \alpha$ | 0 | 1 |
| 0110 | $\alpha$ | $2 + \alpha$ | 0 | $\alpha$ |
| 0111 | $\alpha$ | 3 | 0 | 1 |
| 1000 | 0 | $1 + \alpha + \alpha^2 + \alpha^3$ | 0 | $\alpha^3$ |
| 1001 | 0 | $2 + \alpha + \alpha^2$ | 0 | 1 |
| 1010 | 0 | $2 + 2\alpha$ | 0 | $\alpha$ |
| 1011 | 0 | $3 + \alpha$ | 0 | 1 |
| 1100 | 0 | $2 + \alpha + \alpha^2$ | 0 | $\alpha^2$ |

TABLE 7-continued

| bit pattern | DV | IV | DC | IC |
|---|---|---|---|---|
| 1101 | 0 | $3 + \alpha$ | 0 | 1 |
| 1110 | 0 | $3 + \alpha$ | 0 | $\alpha$ |
| 1111 | 0 | 4 | 0 | 1 |

As a further example of how the state machine operates, if the temporal usage vector of a page is:
0010 1100 0000 0110
then Table 8 indicates the metric value for each time interval. The sum of the metric values is equal to:
$5+3\alpha+\alpha^2+\alpha^3+\alpha^4+\alpha^5+\alpha^6+\alpha^7$
If the exponential rate is 0.1, then the metric value for the page is 5.3111111.

TABLE 8

| 0 | 0 | 1 | 0 | 1 | 1 | 0 | 0 | 0 | 0 | 0 | 0 | 0 | 1 | 1 | 0 |
|---|---|---|---|---|---|---|---|---|---|---|---|---|---|---|---|
| 0 | 0 | 1 | $\alpha$ | 1 | 1 | $\alpha$ | $\alpha^2$ | $\alpha^3$ | $\alpha^4$ | $\alpha^5$ | $\alpha^6$ | $\alpha^7$ | 1 | 1 | $\alpha$ |

Table 9 illustrates the metric values generated for each of the four groups.

TABLE 9

| group | bits | $C_{n-1}DV_n + Iv_n$ | $V_n$ | $C_{n-1}DC_n + IC_n$ | $C_n$ |
|---|---|---|---|---|---|
| init | — | — | — | — | 0 |
| 0 | 0010 | $0(\alpha + \alpha^2) + (1 + \alpha)$ | $1 + \alpha$ | $0(0) + \alpha$ | $\alpha$ |
| 1 | 1100 | $\alpha(0) + (2 + \alpha + \alpha^2)$ | $2 + \alpha + \alpha^2$ | $\alpha(0) + \alpha^2$ | $\alpha^2$ |
| 2 | 0000 | $\alpha^2(\alpha + \alpha^2 + \alpha^3 + \alpha^4) + (0)$ | $\alpha^3 + \alpha^4 + \alpha^5 + \alpha^6$ | $\alpha^2(\alpha^4) + 0$ | $\alpha^6$ |
| 3 | 0110 | $\alpha^6(\alpha) + (2 + \alpha)$ | $2 + \alpha + \alpha^7$ | $\alpha^6(0) + \alpha$ | $\alpha$ |

The sum of the values $V_n$ is equal to the sum of the values in Table 8. In an alternate formulation of this state machine, the DC column of Table 7 is eliminated, and instead an explicit test is performed for an all-zero bit pattern. If the bit pattern is found to be all zeroes, then the value of DC is set to $\alpha^4$, otherwise it is set equal to zero.

From the foregoing it will be appreciated that, although specific embodiments of the invention have been described herein for purposes of illustration, various modifications may be made without deviating from the spirit and scope of the invention. The slinky algorithm of the present invention can be used to generate optimized layouts and organizations of data for other than program images. For example, the slinky algorithm can be used to optimize the layout of data so that the number of cache misses is reduced. A cache miss occurs when data to be accessed by a central processing unit is not currently in a high-speed cache and needs to be retrieved from main memory. A metric function that rates the number of cache misses for a layout is used to guide the slinky algorithm. The data can be considered to be organized into data objects that are permuted as a unit. In addition, the slinky algorithm can be used with various other techniques, other than permutations such as swap and reflect, for generating a new layout or organization. For example, it may be useful to combine two data objects into a single data object or to split a single data object into two data objects. A single data object can be permuted only as a unit, whereas separate data objects can be permuted separately. More generally, the slinky algorithm can be used in conjunction with any technique that generates a metric value for an organization of data and generates a new organization or different constraints for the algorithm. Accordingly, the invention is not limited except as by the appended claims.

What is claimed is:

1. A method in a computer system for incrementally improving the layout of a program image of a computer program to reduce the working set, the program image having basic blocks, each basic block having a temporal usage vector indicating time intervals during which the basic block is accessed, the method comprising:

repeating the following until a termination condition is satisfied, designating one of the basic blocks as an initial anchor basic block;

repeating the following until the same range of basic blocks is identified twice in a row, finding a basic block such that when the basic blocks in the range from the anchor basic block to the found basic block are reordered, the working set is reduced, wherein the act of finding includes finding the basic block with a desired metric value that is calculated from a permutation type and further wherein the anchor basic block and at least two found basic blocks in the repetition delimit ranges having different sizes selected from a group consisting of reflect and swap; and designating the found basic block as the new anchor basic block; and reordering the basic blocks in the range of basic blocks that has been identified twice in a row.

2. The method of claim 1 wherein the designating of one of the basic blocks as an initial anchor basic block includes randomly generating pairs of basic blocks, selecting the pair of basic blocks such that when the basic blocks delimited by the pair of basic blocks are reordered, the working set of the computer program is smaller than the working set resulting from reordering of the basic blocks delimited by another generated pair of basic blocks, and designating one of the basic blocks of the selected pair as the initial anchor basic block.

3. The method of claim 1 wherein the effect on the working set of reordering the basic blocks is indicated by a space-time product metric function.

4. The method of claim 3 wherein the space-time product metric function is a weighted space-time product metric function.

5. The method of claim 1 wherein the reordering of the basic blocks in a range is the swapping of the position of the basic blocks that delimit the range.

6. The method of claim 1 wherein the reordering of the basic blocks in a range is the reflecting of the position of the basic blocks in the range.

7. The method of claim 1 including calculating an estimated size for each basic block by calculating the actual size for each basic block based on the current layout of the program image.

8. The method of claim 7 wherein the actual size of each basic block is calculated by invoking a linker.

9. The method of claim 7 wherein the calculating of the estimated size is perform only once.

10. The method of claim 7 wherein the calculating of the estimated size is performed at a frequency that reduces when no estimated size of a basic block changes.

11. The method of claim 1 wherein the termination condition is a predefined number of repetitions.

12. The method of claim 1 wherein the termination conditions is expiration of predefined time period.

13. The method of claim 1 wherein the termination condition is a predefined evaluation of the program layout.

14. The method of claim 1 wherein the termination condition is based on the rate of improvement of the working set.

15. The method of claim 1 wherein the finding of the basic block finds the basic block such that when the basic blocks in the range are reordered the working set is smaller than the working set that would result from reordering of a range delimited by any other basic block.

16. The method of claim 1 wherein the effect on the working set of reordering the basic blocks takes into consideration the alignment constraints of the basic blocks.

17. The method of claim 1 wherein the temporal usage vectors are coalesced when the usage for each basic block is the same for multiple bit positions.

18. The method of claim 17 wherein the coalescing is performed only if the bit positions are adjacent.

19. The method of claim 1 wherein the finding of a basic block searches increasingly smaller distances between basic blocks based on the distance between previous anchor basic blocks and found basic blocks.

20. The method of claim 1 wherein the effect on the working set of basic blocks on pages before the page that contains the range delimited by the anchor basic block and another basic block are not recalculated.

21. The method of claim 1 wherein the effect on the working set of basic blocks on pages after the page that contains the range delimited by the anchor basic block and another basic block are only recalculated if an improvement is found in the delimited range.

22. The method of claim 1 wherein the effect on the working set for each possible temporal usage patterns of a group of time intervals is pre-calculated.

23. The method of claim 1 wherein the effect on the working set for each possible temporal usage pattern of the group is represented by a state machine table that indicates how to combine effects of temporal usage patterns of previous time intervals.

24. A method in a computer system for identifying basic blocks of a program image of a computer program that, when reordered from an initial order, will reduce the working set of the computer program, the method comprising:

selecting an anchor basic block;

evaluating the effect on the working set of reordering the basic blocks in a plurality of ranges of basic blocks that are delimited at one end by the selected anchor basic block, wherein at least two ranges in the plurality of ranges are of different sizes;

selecting the range of basic blocks whose reordering would have an effect on the working set that is estimated to be more favorable than the other ranges;

selecting as the next anchor basic block the basic block at the other end of the range from the anchor basic block; and repeating the evaluating and selecting until the same range is selected twice in a row whereby the range that is selected twice in a row is the identified range.

25. A method in a computer system for improving the organization of ordered data, the method comprising:

selecting an anchor position within the data;

for each of a plurality of end positions within the data, rating a reorganization of the data between the anchor position and the end position, wherein the act of rating includes rating with a desired metric value that is calculated from a permutation type and further wherein the anchor position and at least two end positions in the plurality of end positions delimit subranges of data having different sizes selected from a group consisting of reflect and swap;

selecting as a new anchor position the end position of the data whose reorganization has the highest rating;

repeating the rating and selecting of a new anchor position until the selected end position is the same as the previous anchor position; and permuting the data between the anchor position and the end position, thus reordering the data.

26. The method of claim 25 wherein the data represents data objects.

27. The method of claim 26 wherein the reorganization includes permuting the data objects.

28. The method of claim 26 wherein the reorganization includes coalescing two data objects into a single data object.

29. The method of claim 26 wherein the reorganization includes splitting a data object into two data objects.

30. The method of claim 26 wherein the data objects are basic blocks of a program image.

31. The method of claim 30 wherein the reorganization includes coalescing two data objects into a single data object.

32. The method of claim 30 wherein the reorganization includes splitting a data object into two data objects.

33. The method of claim 26 wherein the rating rates the effect of the reorganization on paging.

34. The method of claim 26 wherein the rating rates the effect of the reorganization on caching.

35. A computer-readable medium containing instructions for causing a computer system to identify basic blocks of a program image of a computer program that, when reordered from an initial order, will reduce the working set of the computer program, by:

selecting an anchor basic block;

evaluating the effect on the working set of reordering the basic blocks in a plurality of ranges of basic blocks that are delimited at one end by the selected anchor basic block, wherein at least two ranges in the plurality of ranges are of different sizes;

selecting the range of basic blocks whose reordering would have an effect on the working set that is estimated to be more favorable than the other ranges;

selecting as the next anchor basic block the basic block at the other end of the range from the anchor basic block; and repeating the evaluating and selecting until the same range is selected twice in a row whereby the range that is selected twice in a row in the identified range.

36. A computer system for improving the working set of a computer program, the computer program having code portions arranged in a first order, comprising:

a selection component that selects two code portions such that if the code portions delimited by the two code portions in the first order are permuted by a predefined permutation algorithm then the working set of the computer program is improved; and a permutation component that permutes the code portions delimited by the two selected code portions in accordance with the predefined permutation algorithm to arrange the code portions of the computer program in a second order distinct from the first order.

37. A computer-readable medium containing instructions for causing a computer system to improve the organization of ordered data objects, by:

selecting an anchor data object;

for each of a plurality of end data objects, rating a reorganization of the data objects between the anchor data object and the end data object, wherein the act of rating includes rating with a desired metric value that is calculated from a permutation type and further wherein the anchor data object and at least two end data objects in the plurality of end data objects delimit subranges of data objects having different sizes selected from a group consisting of reflect and swap;

selecting as a new anchor data object the end data object whose reorganization has the highest rating;

repeating the rating and selecting of a new anchor data object until the selected end data object is the same as the previous anchor data object; and permuting the data between the anchor position and the end position, thus reordering the data.

38. The computer-readable medium of claim 37 wherein the reorganization includes permuting the data objects.

39. The computer-readable medium of claim 37 wherein the reorganization includes coalescing two data objects into a single data object.

40. The computer-readable medium of claim 37 wherein the reorganization includes splitting a data object into two data objects.

41. The computer-readable medium of claim 37 wherein the data objects are basic blocks of a program image.

42. The computer-readable medium of claim 41 wherein the reorganization includes coalescing two data objects into a single data object.

43. The computer-readable medium of claim 41 wherein the reorganization includes splitting a data object into two data objects.

44. The computer-readable medium of claim 37 wherein the rating rates the effect of the reorganization on paging.

45. The computer-readable medium of claim 37 wherein the rating rates the effect of the reorganization on caching.

46. A computer-readable medium containing instructions for causing a computer system to incrementally improve the layout of a program image of a computer program to reduce the working set, the program image having basic blocks, each basic block having a temporal usage vector indicating time intervals during which the basic block is accessed, by:

repeating the following until a termination condition is satisfied, designating one of the basic blocks as an initial anchor basic block;

repeating the following until the same range of basic blocks is identified twice in a row, finding a basic block such that when the basic blocks in the range from the anchor basic block to the found basic block are reordered, the working set is reduced, wherein the act of finding includes finding the basic block with a desired metric value that is calculated from a permutation type and further wherein the anchor basic block and at least two found basic blocks in the repetition delimit ranges having different sizes selected from a group consisting of reflect and swap; and designating the found basic block as the new anchor basic block; and reordering the basic blocks in the range of basic blocks that has been identified twice in a row.

47. The computer-readable medium of claim 46 wherein the designating of one of the basic blocks as an initial anchor basic block includes randomly generating pairs of basic blocks, selecting the pair of basic blocks such that when the basic blocks delimited by the pair of basic blocks are reordered, the working set of the computer program is smaller than the working set resulting from reordering of the basic blocks delimited by another generated pair of basic blocks, and designating one of the basic blocks of the selected pair as the initial anchor basic block.

48. The computer-readable medium of claim 46 wherein the effect on the working set of reordering the basic blocks is indicated by a space-time product metric function.

49. The computer-readable medium of claim 48 wherein the space-time product metric function is a weighted space-time product metric function.

50. The computer-readable medium of claim 46 wherein the reordering of the basic blocks in a range is the swapping of the data position of the basic blocks that delimit the range.

51. The computer-readable medium of claim 46 wherein the reordering of the basic blocks in a range is the reflecting of the data position of the basic blocks in the range.

52. The computer-readable medium of claim 46 including calculating an estimated size for each basic block by calculating the actual size for each basic block based on the current layout of the program image.

53. The method of claim 1, wherein the permutation type is selected from a group including reflect and swap.

54. The method of claim 25, wherein the permutation type is selected from a group including reflect and swap.

55. The method of claim 37, wherein the permutation type is selected from a group including reflect and swap.

56. The method of claim 46, wherein the permutation type is selected from a group including reflect and swap.

* * * * *

UNITED STATES PATENT AND TRADEMARK OFFICE
CERTIFICATE OF CORRECTION

PATENT NO. : 6,381,740 B1  Page 1 of 1
DATED : April 30, 2002
INVENTOR(S) : John W. Miller, John R. Douceur and Robert P. Fitzgerald It is certified that error appears in the above-identified patent and that said Letters Patent is hereby corrected as shown below:

<u>Title page</u>
Item [*] Notice:
The patent term adjustment is 5 days.

<u>Column 23,</u>
Lines 52-64, "Claim 36" should be cancelled.

Signed and Sealed this

Twentieth Day of May, 2003

JAMES E. ROGAN
*Director of the United States Patent and Trademark Office*